United States Patent
Li et al.

(10) Patent No.: US 10,638,311 B2
(45) Date of Patent: Apr. 28, 2020

(54) COMMUNICATION METHOD FOR MOBILE TERMINAL AND MOBILE TERMINAL

(71) Applicant: Huawei Technologies Co., Ltd., Shenzhen (CN)

(72) Inventors: Wenhao Li, Shenzhen (CN); Yubin Xia, Shanghai (CN); Haibo Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 15/795,491

(22) Filed: Oct. 27, 2017

(65) Prior Publication Data
US 2018/0054732 A1 Feb. 22, 2018

Related U.S. Application Data

(63) Continuation of application No. PCT/CN2015/098761, filed on Dec. 24, 2015.

(30) Foreign Application Priority Data

Apr. 30, 2015 (CN) .......................... 2015 1 0217336

(51) Int. Cl.
*H04L 29/06* (2006.01)
*G06F 21/53* (2013.01)
(Continued)

(52) U.S. Cl.
CPC ............ *H04W 12/02* (2013.01); *G06F 21/53* (2013.01); *H04W 12/0013* (2019.01);
(Continued)

(58) Field of Classification Search
CPC ............. H04W 12/02; H04W 12/0013; H04W 12/0806; G06F 21/53; G06F 2221/2149; H04L 63/0428; H04M 1/68
See application file for complete search history.

(56) References Cited

U.S. PATENT DOCUMENTS

2007/0270170 A1 11/2007 Yoon et al.
2012/0216242 A1 8/2012 Uner et al.
(Continued)

FOREIGN PATENT DOCUMENTS

CN 1585539 A 2/2005
CN 102045712 A 5/2011
(Continued)

OTHER PUBLICATIONS

"ARM Security Technology—Building a Secure System using TrustZone Technology"; ARM Limited; 2009; 108 pages.

*Primary Examiner* — Amir Mehrmanesh
(74) *Attorney, Agent, or Firm* — Kilpatrick Townsend & Stockton LLP

(57) ABSTRACT

Embodiments of the present disclosure disclose a secure communication method for a mobile terminal and a mobile terminal. The secure communication method may include: when a wireless communication connection is established between the mobile terminal and another mobile terminal, and the wireless communication connection meets a preset security processing trigger condition, prohibiting, by means of setting, a program in a common virtual kernel from accessing a shared memory between a secure virtual kernel and the common virtual kernel and accessing a peripheral that needs to be called for the wireless communication connection; performing, by using the secure virtual kernel, preset policy-based processing on communication content corresponding to the wireless communication connection; and outputting, by using the secure virtual kernel, communication content obtained by performing the preset policy-based processing.

12 Claims, 6 Drawing Sheets

(51) Int. Cl.
     *H04W 12/02*     (2009.01)
     *H04W 12/08*     (2009.01)
     *H04W 12/00*     (2009.01)
     *H04M 1/68*      (2006.01)
(52) U.S. Cl.
     CPC . *H04W 12/0806* (2019.01); *G06F 2221/2149* (2013.01); *H04L 63/0428* (2013.01); *H04M 1/68* (2013.01)

(56) References Cited

U.S. PATENT DOCUMENTS

| | | | |
|---|---|---|---|
| 2013/0145475 | A1 | 6/2013 | Ryu et al. |
| 2013/0179403 | A1 | 7/2013 | Kim et al. |
| 2014/0007120 | A1 | 1/2014 | Spitz |
| 2014/0045545 | A1 | 2/2014 | Zhou et al. |
| 2014/0148123 | A1* | 5/2014 | Raleigh ............ H04W 12/003 455/406 |
| 2014/0281560 | A1* | 9/2014 | Ignatchenko ......... G06F 21/57 713/181 |
| 2017/0011206 | A1* | 1/2017 | Marion ............... G06F 21/53 |
| 2017/0220823 | A1* | 8/2017 | Law ................... G06F 21/85 |
| 2019/0104114 | A1* | 4/2019 | Jaroch ............... H04L 63/0428 |
| 2019/0166638 | A1* | 5/2019 | Hintermeister ..... H04W 12/003 |

FOREIGN PATENT DOCUMENTS

| | | |
|---|---|---|
| CN | 102209318 A | 10/2011 |
| CN | 102271191 A | 12/2011 |
| CN | 102307346 A | 1/2012 |
| CN | 102413462 A | 4/2012 |
| CN | 102761409 A | 10/2012 |
| CN | 102857914 A | 1/2013 |
| CN | 103197991 A | 7/2013 |
| CN | 103249036 A | 8/2013 |
| CN | 103457958 A | 12/2013 |
| CN | 103577740 A | 2/2014 |
| EP | 2648129 A1 | 10/2013 |
| KR | 20130062219 A | 6/2013 |
| WO | 2014137343 A1 | 9/2014 |
| WO | 2014141206 A1 | 9/2014 |

\* cited by examiner

COMMUNICATION METHOD FOR MOBILE TERMINAL AND MOBILE TERMINAL

CROSS-REFERENCE TO RELATED APPLICATIONS

This application is a continuation of International Application No. PCT/CN2015/098761, filed on Dec. 24, 2015, which claims priority to Chinese Patent Application No. 201510217336.8, filed on Apr. 30, 2015. The disclosures of the aforementioned applications are hereby incorporated by reference in their entireties.

TECHNICAL FIELD

The present application relates to the communications field, and in particular, to a secure communication method for a mobile communications terminal and a mobile communications terminal.

BACKGROUND

With development of mobile communications technologies, mobile terminals have been widely popular, and the mobile terminals have become necessities in daily life of a user. When working, shopping, or taking recreation by using a mobile terminal, the user transmits private information. The private information may be eavesdropped on by a criminal, and therefore lead to serious consequences such as privacy disclosure and a property loss of the user. Mobile communication security has been increasingly concerned about by the government, the society, and the user, and network security and information security issues have even risen to a national strategic height.

In the prior art, before a call is initiated or answered by using a mobile terminal, a process that includes a recording module is usually searched and ended, so as to prevent call content from being secretly recorded, thereby preventing a background process from eavesdropping.

In the foregoing method, the background process is prevented from eavesdropping when an operating system of the mobile terminal is trusted. However, nowadays, as functions of mobile terminals are increasingly abundant, architectures of operating systems of the mobile terminals are increasingly complex, and there is a growing quantity of security vulnerabilities. Therefore, a communication security technology that can be used to prevent attacks from the operating systems needs to be urgently developed.

SUMMARY

Embodiments of the present disclosure disclose a secure communication method for a mobile terminal and a mobile terminal, to prevent an operating system from eavesdropping on communication content of a user, and improve communication security of the mobile terminal.

A first aspect of the embodiments of the present disclosure discloses a secure communication method for a mobile terminal, where an application processor of the mobile terminal includes a secure virtual kernel and a common virtual kernel, the secure virtual kernel and the common virtual kernel share a central processing unit CPU, a memory, a bus, and a peripheral that are of the mobile terminal, and a program in the common virtual kernel is prohibited from accessing an application processor resource of the secure virtual kernel; and the secure communication method includes:

when a wireless communication connection is established between the mobile terminal and another mobile terminal, and the wireless communication connection meets a preset security processing trigger condition, prohibiting, by the mobile terminal by means of setting, the program in the common virtual kernel from accessing a shared memory between the secure virtual kernel and the common virtual kernel and accessing a peripheral that needs to be called for the wireless communication connection;

performing, by the mobile terminal by using the secure virtual kernel, preset policy-based processing on communication content corresponding to the wireless communication connection; and outputting, by the mobile terminal by using the secure virtual kernel, the communication content obtained by performing the preset policy-based processing.

With reference to the first aspect, in a first feasible implementation, the peripheral that needs to be called for the wireless communication connection includes an audio recording device, and the communication content includes a recorded audio signal;

the performing, by the mobile terminal by using the secure virtual kernel, preset policy-based processing on communication content corresponding to the wireless communication connection specifically includes:

when the communication content is an audio signal recorded by the audio recording device, performing, by the mobile terminal, encryption processing on the recorded audio signal by using the secure virtual kernel; and coding, by the mobile terminal by using the secure virtual kernel, the audio signal obtained by performing the encryption processing, so as to obtain a to-be-sent audio signal; and the outputting, by the mobile terminal by using the secure virtual kernel, the communication content obtained by performing the preset policy-based processing specifically includes:

controlling, by using the secure virtual kernel, the mobile terminal to send the to-be-sent audio signal to the another mobile terminal.

With reference to the first aspect or the first feasible implementation of the first aspect, in a second feasible implementation, the peripheral that needs to be called for the wireless communication connection includes an audio playing device, and the communication content includes a received audio signal;

the performing, by the mobile terminal by using the secure virtual kernel, preset policy-based processing on communication content corresponding to the wireless communication connection specifically includes:

when the communication content is an audio signal received by the mobile terminal, decoding, by the mobile terminal, the audio signal by using the secure virtual kernel; and performing, by the mobile terminal by using the secure virtual kernel, decryption processing on the decoded audio signal, so as to obtain a to-be-played audio signal; and the outputting, by the mobile terminal by using the secure virtual kernel, the communication content obtained by performing the preset policy-based processing specifically includes:

controlling, by the mobile terminal by using the secure virtual kernel, the audio playing device to play the to-be-played audio signal.

With reference to any one of the first aspect, or the first to the second feasible implementations of the first aspect, in a third feasible implementation, the peripheral that needs to be called for the wireless communication connection includes a video recording device, and the communication content includes a recorded video signal;

the performing, by the mobile terminal by using the secure virtual kernel, preset policy-based processing on communication content corresponding to the wireless communication connection specifically includes:

when the communication content is a video signal recorded by the video recording device, performing, by the mobile terminal, encryption processing on the recorded video signal by using the secure virtual kernel; and coding, by the mobile terminal by using the secure virtual kernel, the video signal obtained by performing the encryption processing, so as to obtain a to-be-sent video signal; and the outputting, by the mobile terminal by using the secure virtual kernel, the communication content obtained by performing the preset policy-based processing specifically includes:

controlling, by using the secure virtual kernel, the mobile terminal to send the to-be-sent video signal to the another mobile terminal.

With reference to any one of the first aspect, or the first to the third feasible implementations of the first aspect, in a fourth feasible implementation, the peripheral that needs to be called for the wireless communication connection includes a display, and the communication content includes a received video signal;

the performing, by the mobile terminal by using the secure virtual kernel, preset policy-based processing on communication content corresponding to the wireless communication connection specifically includes:

when the communication content is a video signal received by the mobile terminal, decoding, by the mobile terminal, the received video signal by using the secure virtual kernel; and performing, by the mobile terminal by using the secure virtual kernel, decryption processing on the decoded video signal, so as to obtain a to-be-played video signal; and the outputting, by the mobile terminal by using the secure virtual kernel, the communication content obtained by performing the preset policy-based processing specifically includes:

controlling, by the mobile terminal by using the secure virtual kernel, the display to play the to-be-played video signal.

With reference to any one of the first aspect, or the first to the fourth feasible implementations of the first aspect, in a fifth feasible implementation, before the wireless communication connection is established between the mobile terminal and the another mobile terminal, the secure communication method further includes:

prohibiting, by the mobile terminal by means of setting, the program in the common virtual kernel from accessing interrupt information related to the wireless communication connection that meets the preset security processing trigger condition.

A second aspect of the embodiments of the present disclosure provides a mobile terminal, where an application processor of the mobile terminal includes a secure virtual kernel and a common virtual kernel, the secure virtual kernel and the common virtual kernel share a central processing unit CPU, a memory, a bus, and a peripheral that are of the mobile terminal, and a program in the common virtual kernel is prohibited from accessing an application processor resource of the secure virtual kernel; and the mobile terminal includes:

a first setting unit, configured to: when a wireless communication connection is established between the mobile terminal and another mobile terminal, and the wireless communication connection meets a preset security processing trigger condition, prohibit, by means of setting, the program in the common virtual kernel from accessing a shared memory between the secure virtual kernel and the common virtual kernel and accessing a peripheral that needs to be called for the wireless communication connection;

a processing unit, configured to perform, by using the secure virtual kernel, preset policy-based processing on communication content corresponding to the wireless communication connection; and an output unit, configured to output, by using the secure virtual kernel, the communication content obtained by performing the preset policy-based processing.

With reference to the second aspect, in a first feasible implementation, the peripheral that needs to be called for the wireless communication connection includes an audio recording device, and the communication content includes a recorded audio signal;

the processing unit includes:

a first encryption subunit, configured to: when the communication content is an audio signal recorded by the audio recording device, perform encryption processing on the recorded audio signal by using the secure virtual kernel; and a first coding subunit, configured to code, by using the secure virtual kernel, the audio signal obtained by performing the encryption processing, so as to obtain a to-be-sent audio signal; and the output unit is specifically configured to control, by using the secure virtual kernel, the mobile terminal to send the to-be-sent audio signal to the another mobile terminal.

With reference to the second aspect or the first feasible implementation of the second aspect, in a second feasible implementation, the peripheral that needs to be called for the wireless communication connection includes an audio playing device, and the communication content includes a received audio signal;

the processing unit includes:

a first decoding subunit, configured to: when the communication content is an audio signal received by the mobile terminal, decode the audio signal by using the secure virtual kernel; and a first decryption subunit, configured to perform, by using the secure virtual kernel, decryption processing on the decoded audio signal, so as to obtain a to-be-played audio signal; and the output unit is specifically configured to control, by using the secure virtual kernel, the audio playing device to play the to-be-played audio signal.

With reference to any one of the second aspect, or the first to the second feasible implementations of the second aspect, in a third feasible implementation, the peripheral that needs to be called for the wireless communication connection includes a video recording device, and the communication content includes a recorded video signal;

the processing unit includes:

a second encryption subunit, configured to: when the communication content is a video signal recorded by the video recording device, perform encryption processing on the recorded video signal by using the secure virtual kernel; and a second coding subunit, configured to code, by using the secure virtual kernel, the video signal obtained by performing the encryption processing, so as to obtain a to-be-sent video signal; and the output unit is specifically configured to control, by using the secure virtual kernel, the mobile terminal to send the to-be-sent video signal to the another mobile terminal.

With reference to any one of the second aspect, or the first to the third feasible implementations of the second aspect, in a fourth feasible implementation, the peripheral that needs to be called for the wireless communication connection includes a display, and the communication content includes a received video signal;

the processing unit includes:

a second decoding subunit, configured to: when the communication content is a video signal received by the mobile terminal, decode the received video signal by using the secure virtual kernel; and a second decryption subunit, configured to perform, by using the secure virtual kernel, decryption processing on the decoded video signal, so as to obtain a to-be-played video signal; and the output unit is specifically configured to control, by using the secure virtual kernel, the display to play the to-be-played video signal.

With reference to any one of the second aspect, or the first to the fourth feasible implementations of the second aspect, in a fifth feasible implementation, the mobile terminal further includes:

a second setting unit, configured to prohibit, by means of setting, the program in the common virtual kernel from accessing interrupt information related to the wireless communication connection.

In the embodiments of the present disclosure, when a wireless communication connection is established between a mobile terminal and another mobile terminal, and the wireless communication connection meets a preset security processing trigger condition, the mobile terminal prohibits, by means of setting, a program in a common virtual kernel from accessing a shared memory between a secure virtual kernel and the common virtual kernel and accessing a peripheral that needs to be called for the wireless communication connection; performs, by using the secure virtual kernel, preset policy-based processing on communication content corresponding to the wireless communication connection; and then outputs, by using the secure virtual kernel, the communication content obtained by performing the preset policy-based processing, so that an operating system and the program running in the common virtual kernel can be prevented from obtaining unprocessed communication content, and the operating system can also be prevented from eavesdropping on the communication content by using the shared memory or the related peripheral, thereby improving communication security of the mobile terminal.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

With reference to the accompanying drawings, the following describes in detail a secure communication method for a mobile terminal and a mobile terminal that are provided in the embodiments of the present disclosure. In the embodiments of the present disclosure, the mobile terminal includes but is not limited to a terminal that may be used for communication, such as a mobile phone, a personal computer, or a notebook computer.

Figure 1:
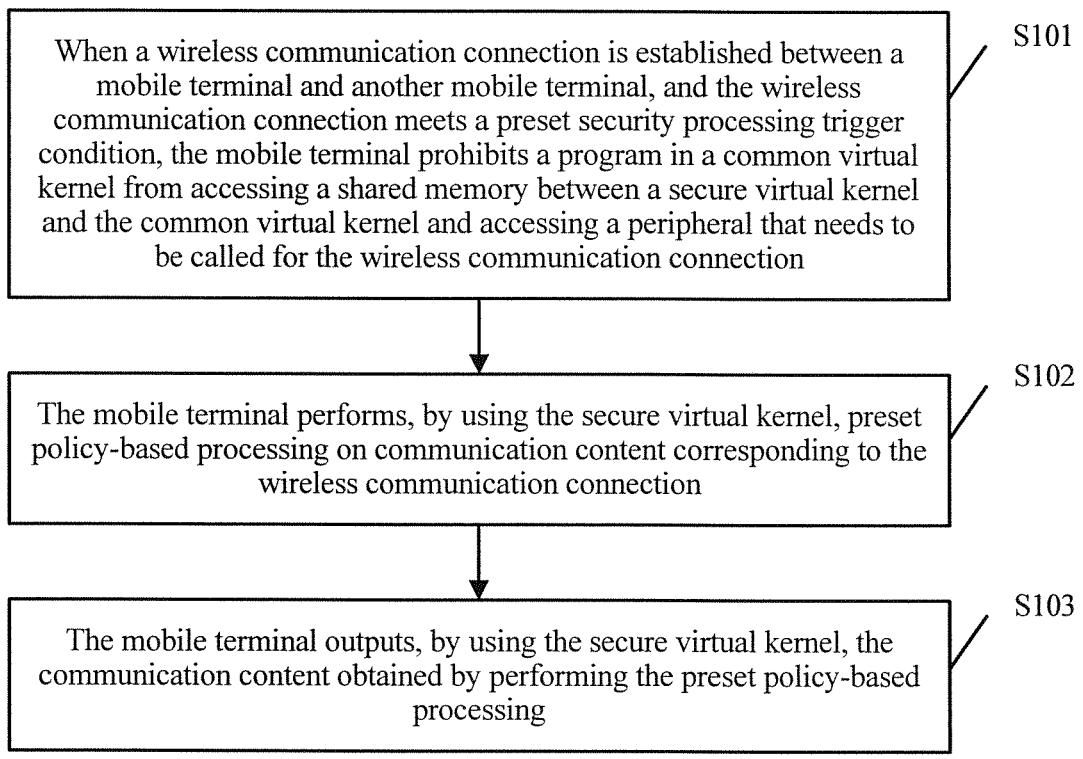
FIG. 1 is a schematic flowchart of an embodiment of a secure communication method for a mobile terminal in the present disclosure.

Referring to FIG. 1, FIG. 1 is a schematic flowchart of an embodiment of a secure communication method for a mobile terminal in the present disclosure. As shown in FIG. 1, in this embodiment, the secure communication method includes the following steps.

S101. When a wireless communication connection is established between a mobile terminal and another mobile terminal, and the wireless communication connection meets a preset security processing trigger condition, the mobile terminal prohibits, by means of setting, a program in a common virtual kernel from accessing a shared memory between a secure virtual kernel and the common virtual kernel and accessing a peripheral that needs to be called for the wireless communication connection.

In this embodiment of the present disclosure, a CPU (central processing unit) of the mobile terminal includes at least an application processor. When the mobile terminal is a mobile phone, the CPU of the mobile terminal further includes a baseband processor. The application processor includes a secure virtual kernel and a common virtual kernel, and the secure virtual kernel and the common virtual kernel share a CPU, a memory, a peripheral, and a bus that are of the mobile terminal. In a specific implementation, the secure virtual kernel exclusively occupies some application processor hardware resources, and the program in the common virtual kernel is prohibited from accessing the application processor resources exclusively occupied by the secure virtual kernel.

In a specific implementation, a baseband system of the mobile terminal runs in the baseband processor; some security modules run in the secure virtual kernel; and an operating system of the mobile terminal runs in the common virtual kernel, such as Android, iOS, or Windows Phone.

In a feasible implementation, the mobile terminal may be a mobile terminal that uses an ARM (advanced reduced instruction set computing machine) processor and that is based on a TrustZone technology.

Optionally, the wireless communication connection may include but is not limited to: a common telephone connection, a network voice connection (including a network telephone connection or another voice connection between real-time communications clients), a network video connection, or the like.

In some feasible implementations, in this embodiment of the present disclosure, when short message communication or mail communication may be further performed between the mobile terminal and the another mobile terminal, the program in the common virtual kernel is prohibited, by means of setting, from accessing the shared memory between the secure virtual kernel and the common virtual kernel and assessing the peripheral that needs to be called for the short message communication or the mail communication. The peripheral that needs to be called for the short message communication or the mail communication may include one or more of a push-button, a keyboard, a tablet, or a display.

In some feasible implementations, it may be determined, by detecting some trigger actions of the mobile terminal, that the wireless communication connection is established between the mobile terminal and the another mobile terminal; for example, when it is detected that the mobile terminal performs a dialing operation, or when it is detected that the mobile terminal logs in to a real-time communications client, it may be considered that the wireless communication connection is established between the mobile terminal and the another mobile terminal.

In some feasible implementations, it may be determined, by detecting some interrupt signals related to the wireless communication connection, that the wireless communication connection is established between the mobile terminal and the another mobile terminal; for example, when an incoming call is made by the another mobile terminal, the application processor receives incoming call information interrupt request sent by the baseband processor.

Optionally, that the wireless communication connection meets the preset security processing trigger condition may be: The other mobile terminal that establishes the wireless communication connection to the mobile terminal meets a security condition set by the mobile terminal, for example, the wireless communication connection is a wireless communication connection between the mobile terminal and a buddy in an address book, or may be: A type of the wireless communication connection meets a security type set by the mobile terminal, for example, the wireless communication connection is a telephone connection.

In some feasible implementations, after being powered on, the mobile terminal may prohibit, by means of setting, the program in the common virtual kernel from accessing interrupt information related to the wireless communication connection that meets the preset security processing trigger condition. For example, when detecting any incoming call signal or detecting an incoming call signal of the buddy in the address book, the baseband system sends the incoming call information interrupt request to the application processor. Because the program in the common virtual kernel is prohibited, by means of presetting, from accessing the incoming call information interrupt request, the application processor processes the incoming call information interrupt request by using the secure virtual kernel after receiving the incoming call information interrupt request.

Optionally, when the wireless communication connection relates to a voice call (such as a common telephone call, a network telephone call, or a voice session initiated by using a real-time communications client), the peripheral that needs to be called includes at least an audio recording device and an audio playing device. In a specific implementation, the audio recording device and the audio playing device may be a same device, for example, a microphone of the mobile terminal.

Optionally, when the wireless communication connection relates to a video call, the peripheral that needs to be called includes at least a video recording device, an audio recording device, an audio playing device, and a display, such as a camera, a microphone, and a display that are of the mobile terminal.

In some feasible implementations, the mobile terminal may set, to a security interrupt and by using a GIC (generic interrupt controller) or a TZIC (TrustZone interrupt controller), the interrupt information related to the wireless communication connection, so that the interrupt information is accessed only in the secure virtual kernel. In a specific implementation, the GIC or the TZIC is connected to all interrupt sources of the mobile terminal, and may first intercept an interrupt request of the mobile terminal; and the GIC or the TZIC hands over, to the secure virtual kernel, an interrupt request related to the wireless communication connection for processing.

In some feasible implementations, the mobile terminal divides a physical memory into multiple memory areas by using a TZASC (TrustZone address space controller), and configures, by using software running in the secure virtual kernel, some memory areas to be secure memory areas or non-secure memory areas, and the TZASC may prohibit the program running in the common virtual kernel from accessing the secure memory area.

In some feasible implementations, the mobile terminal configures a security attribute of the peripheral by using a TZPC (TrustZone protection controller), classifies the peripheral as a secure peripheral or a non-secure peripheral, and prohibits the program running in the common virtual kernel from accessing the secure peripheral.

S102. The mobile terminal performs, by using the secure virtual kernel, preset policy-based processing on communication content corresponding to the wireless communication connection.

Optionally, the communication content corresponding to the wireless communication connection includes communication content to be sent by the mobile terminal and communication content received by the mobile terminal.

Optionally, for the to-be-sent communication content, the preset policy-based processing may include one or more of encryption, analog-to-digital conversion, coding, modulation, or the like. For the received communication content, the preset policy-based processing may include one or more of decryption, demodulation, decoding, digital-to-analog conversion, or the like. The preset policy-based processing is performed by using the secure virtual kernel of the mobile terminal, and the program in the common virtual kernel cannot access communication content obtained before the preset policy-based processing is performed.

In a specific implementation, because there is a large amount of code in an operating system running in a common virtual kernel, there is a relatively large quantity of security vulnerabilities. Because there is a small amount of code in a module running in a secure virtual kernel, security can be easily verified. Preset policy-based processing is performed on communication content by using the secure virtual kernel, so that the operating system running in the common virtual kernel can be prevented from obtaining communication content obtained before the preset policy-based processing is performed, and the operating system can be prevented from eavesdropping on the communication content.

S103. The mobile terminal outputs, by using the secure virtual kernel, the communication content obtained by performing the preset policy-based processing.

In a specific implementation, after performing the preset policy-based processing on the communication content to be sent by the mobile terminal, the mobile terminal may send the to-be-sent communication content by using a radio frequency module or a wireless network connection module. Communication content of a telephone call or a short message may be sent by using the radio frequency module of the mobile terminal; and communication content of a mail, a network voice call, a video call, or the like may be sent by using the wireless network connection module. In this embodiment of the present disclosure, the network connection module may be a Wi-Fi module, and is configured to enable the mobile terminal to access the Internet.

After performing the preset policy-based processing on the communication content received by the mobile terminal, the mobile terminal may output the received communication content. Optionally, if the received communication content is a voice, the received communication content may be output by using an audio playing device (for example, a microphone); if the received communication content is a video, the received communication content may be output by using a display and an audio playing device; or if the received communication content is a text or a picture, the received communication content may be output by using a display.

In this embodiment of the present disclosure, when a wireless communication connection is established between a mobile terminal and another mobile terminal, and the wireless communication connection meets a preset security processing trigger condition, the mobile terminal prohibits, by means of setting, a program in a common virtual kernel from accessing a shared memory between a secure virtual kernel and the common virtual kernel and accessing a peripheral that needs to be called for the wireless communication connection; performs, by using the secure virtual kernel, preset policy-based processing on communication content corresponding to the wireless communication connection; and then outputs, by using the secure virtual kernel, the communication content obtained by performing the preset policy-based processing, so that an operating system and the program running in the common virtual kernel can be prevented from obtaining unprocessed communication content, and the operating system can also be prevented from eavesdropping on the communication content by using the shared memory or the related peripheral, thereby improving communication security of the mobile terminal.

Figure 2:
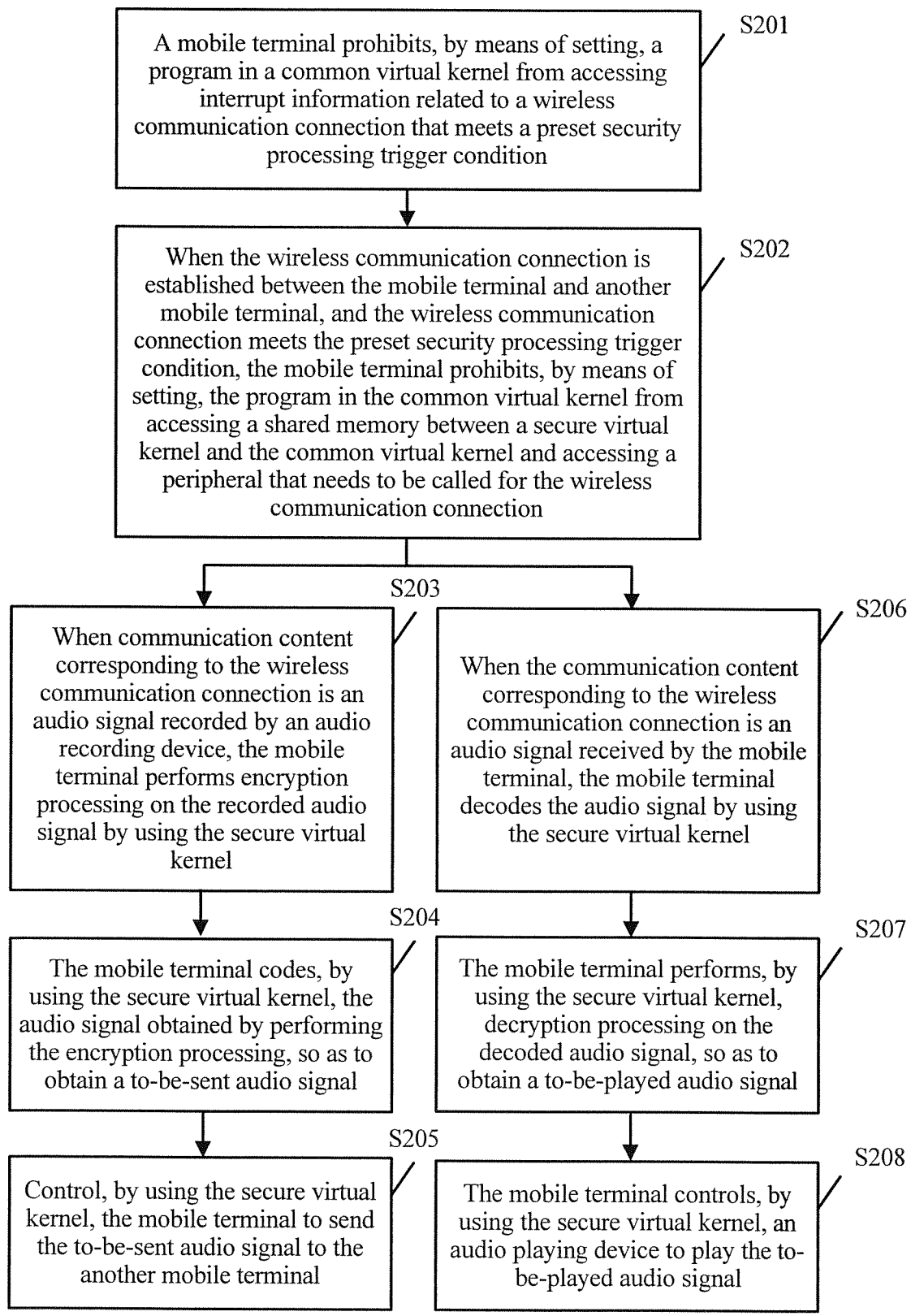
FIG. 2 is a schematic flowchart of another embodiment of a secure communication method for a mobile terminal in the present disclosure.

Referring to FIG. 2, FIG. 2 is a schematic flowchart of another embodiment of a secure communication method for a mobile terminal in the present disclosure. As shown in FIG. 2, in this embodiment, the secure communication method includes the following steps.

S201. A mobile terminal prohibits, by means of setting, a program in a common virtual kernel from accessing interrupt information related to a wireless communication connection that meets a preset security processing trigger condition.

Optionally, the wireless communication connection may include but is not limited to: a common telephone connection, a network voice connection (including a network telephone connection or another voice connection between real-time communications clients), a network video connection, or the like.

In some feasible implementations, in addition to the interrupt info/Elation related to the wireless communication connection that meets the preset security processing trigger condition, the mobile terminal may further prohibit, by means of setting, the program in the common virtual kernel from accessing some interrupt signals related to a specific type of the wireless communication connection, such as a short message or a mail.

Optionally, that the wireless communication connection meets the preset security processing trigger condition may be: Another mobile terminal that establishes the wireless communication connection to the mobile terminal meets a security condition set by the mobile terminal, for example, the wireless communication connection is a wireless communication connection between the mobile terminal and a buddy in an address book, or may be: A type of the wireless communication connection meets a security type set by the mobile terminal, for example, the wireless communication connection is a telephone connection.

In a specific implementation, after being powered on, the mobile terminal may prohibit, by means of setting, the program in the common virtual kernel from accessing the interrupt information related to the wireless communication connection that meets the preset security processing trigger condition. When receiving the interrupt information related to the wireless communication connection that meets the preset security processing trigger condition, the mobile terminal hands over the interrupt information to a secure virtual kernel for processing.

In some feasible implementations, the mobile terminal may set, to a security interrupt and by using a GIC (generic interrupt controller) or a TZIC (TrustZone interrupt controller), the interrupt information related to the wireless communication connection, so that the interrupt information is accessed only in the secure virtual kernel. In a specific implementation, the GIC or the TZIC is connected to all interrupt sources of the mobile terminal, and may first intercept an interrupt request of the mobile terminal; and the GIC or the TZIC hands over, to the secure virtual kernel, an interrupt request related to the wireless communication connection for processing.

S202. When the wireless communication connection is established between the mobile terminal and another mobile terminal, and the wireless communication connection meets the preset security processing trigger condition, the mobile terminal prohibits, by means of setting, the program in the common virtual kernel from accessing a shared memory between a secure virtual kernel and the common virtual kernel and accessing a peripheral that needs to be called for the wireless communication connection.

In some feasible implementations, it may be determined, by detecting some trigger actions of the mobile terminal, that the wireless communication connection is established between the mobile terminal and the another mobile terminal; for example, when it is detected that the mobile terminal performs a dialing operation, or when it is detected that the mobile terminal enters a dialing screen, it may be considered that a telephone connection is established between the mobile terminal and the another mobile terminal.

In some feasible implementations, it may be determined, by detecting some interrupt signals related to the wireless communication connection, that the wireless communication connection is established between the mobile terminal and the another mobile terminal; for example, when an incoming call is made by the another mobile terminal, an application processor of the mobile terminal receives incoming call information interrupt request sent by a baseband processor.

In this embodiment, an example in which the wireless communication connection is a voice connection is used for description. The voice connection includes a telephone connection or a network voice connection, and the peripheral that needs to be called for the voice connection includes at least an audio recording device and an audio playing device. In a specific implementation, the audio recording device and the audio playing device may be a same device, for example, a microphone of the mobile terminal.

In this embodiment of the present disclosure, a CPU (central processing unit) of the mobile terminal includes at least an application processor. When the mobile terminal is a mobile phone, the CPU of the mobile terminal further includes a baseband processor. The application processor includes a secure virtual kernel and a common virtual kernel, and the secure virtual kernel and the common virtual kernel share a CPU, a memory, a peripheral, and a bus that are of the mobile terminal. In a specific implementation, the secure virtual kernel exclusively occupies some application processor hardware resources, and the program in the common virtual kernel is prohibited from accessing the application processor resources exclusively occupied by the secure virtual kernel.

In a specific implementation, a baseband system of the mobile terminal runs in the baseband processor; some security modules run in the secure virtual kernel; and an operating system of the mobile terminal runs in the common virtual kernel, such as Android, iOS, or Windows Phone.

In a feasible implementation, the mobile terminal may be a mobile terminal that uses an ARM processor and that is based on a TrustZone technology.

In some feasible implementations, the mobile terminal divides a physical memory into multiple memory areas by using a TZASC (TrustZone address space controller), and configures, by using software running in the secure virtual kernel, some memory areas to be secure memory areas or non-secure memory areas, and the TZASC may prohibit the program running in the common virtual kernel from accessing the secure memory area.

In some feasible implementations, the mobile terminal configures a security attribute of the peripheral by using a TZPC (TrustZone protection controller), classifies the peripheral as a secure peripheral or a non-secure peripheral, and prohibits the program running in the common virtual kernel from accessing the secure peripheral.

S203. When communication content corresponding to the wireless communication connection is an audio signal recorded by an audio recording device, the mobile terminal performs encryption processing on the recorded audio signal by using the secure virtual kernel.

In this embodiment of the present disclosure, when the wireless communication connection is a voice connection, the communication content corresponding to the wireless communication connection includes an audio signal recorded by the mobile terminal and an audio signal received by the mobile terminal. The audio signal recorded by the mobile terminal is call content to be conveyed by a user of the mobile terminal to a user of the another mobile terminal in a call process, and the audio signal received by the mobile terminal is call content to be conveyed by the user of the another mobile terminal to the user of the mobile terminal in the call process. Specifically, the recorded audio signal is recorded by the audio recording device (for example, a microphone) of the mobile terminal. After obtaining the recorded audio signal from the audio recording device, the secure virtual kernel may perform the encryption processing on the recorded audio signal, so as to prevent disclosure of call content during an eavesdropping attack on a mobile communications link.

S204. The mobile terminal codes, by using the secure virtual kernel, the audio signal obtained by performing the encryption processing, so as to obtain a to-be-sent audio signal.

In some feasible implementations, when the wireless communication connection is a telephone connection, the coding, by using the secure virtual kernel, the audio signal obtained by performing the encryption processing may include: instructing, by using the secure virtual kernel, the baseband processor of the mobile terminal to perform analog-to-digital conversion, voice coding, channel coding, and physical layer encryption and modulation on the audio signal obtained after the encryption processing is performed. Optionally, to improve call quality, the baseband processor may be further instructed to perform other processing such as interleaving, equalization, and filtering on the recorded audio signal.

In some feasible implementations, when the wireless communication connection is a network voice connection, the coding, by using the secure virtual kernel, the audio signal obtained by performing the encryption processing may specifically include: performing, by using a hardware resource or a software resource of the secure virtual kernel, analog-to-digital conversion, voice coding, channel coding, and physical layer encryption on the audio signal obtained by performing the encryption processing. Optionally, to improve network voice call quality, other processing such as interleaving, equalization, and filtering may be further performed on the recorded audio signal.

S205. Control, by using the secure virtual kernel, the mobile terminal to send the to-be-sent audio signal to the another mobile terminal.

In some feasible implementations, when the wireless communication connection is a telephone connection, the controlling, by using the secure virtual kernel, the mobile terminal to send the to-be-sent audio signal to the another mobile terminal may include: controlling, by using the secure virtual kernel, a radio frequency module of the mobile terminal to send the to-be-sent audio signal to the another mobile terminal.

In some feasible implementations, when the wireless communication connection is a network voice connection, the controlling, by using the secure virtual kernel, the mobile terminal to send the to-be-sent audio signal to the another mobile terminal may include: controlling, by using the secure virtual kernel, a wireless network connection module (for example, a Wi-Fi module) of the mobile terminal to send the to-be-sent audio signal to the another mobile terminal. Specifically, to ensure a security environment of the secure virtual kernel, the wireless network connection module may run in the common virtual kernel of the mobile terminal. After obtaining the to-be-sent audio signal, the secure virtual kernel may transmit the to-be-sent audio signal to the common virtual kernel, and instruct the common virtual kernel to send the to-be-sent audio signal to the another mobile terminal by using the wireless network connection module.

S206. When the communication content corresponding to the wireless communication connection is an audio signal received by the mobile terminal, the mobile terminal decodes the audio signal by using the secure virtual kernel.

In some feasible implementations, when the wireless communication connection is a telephone connection, the mobile terminal receives, by using the radio frequency module, an audio signal sent by the another mobile terminal by using a mobile phone network. In this case, the decoding the audio signal by using the secure virtual kernel may include: instructing, by using the secure virtual kernel, the baseband processor to perform processing such as demodulation, channel decoding, physical layer decryption, voice decoding, and digital-to-analog conversion on the received audio signal. Optionally, to improve call quality, other processing such as equalization, channel separation, and de-interleaving may be further performed on the received audio signal.

In some feasible implementations, when the wireless communication connection is a network voice connection, the mobile terminal receives, by using the wireless network connection module, an audio signal sent by the another mobile terminal by using the Internet. Specifically, to ensure a security environment of the secure virtual kernel, the wireless network connection module may run in the common virtual kernel of the mobile terminal. The common virtual kernel controls the wireless network connection module to receive the audio signal sent by the another mobile terminal, and then transmits the received audio signal to the secure virtual kernel for processing. In this case, the decoding the audio signal by using the secure virtual kernel may include: performing channel decoding, physical layer decryption, voice decoding, and digital-to-analog conversion on the received audio signal by using the secure virtual kernel. Optionally, to improve call quality, other processing such as equalization, channel separation, and de-interleaving may be further performed on the received audio signal.

S207. The mobile terminal performs, by using the secure virtual kernel, decryption processing on the decoded audio signal, so as to obtain a to-be-played audio signal.

In some feasible implementations, before coding and sending the received audio signal, the another mobile terminal first performs upper-layer encryption on the received audio signal to prevent disclosure of call content during an eavesdropping attack on a mobile communications link. The mobile terminal receives the audio signal obtained by performing the upper-layer encryption processing. After decoding the audio signal, the mobile terminal further needs to perform decryption processing on the audio signal.

S208. The mobile terminal controls, by using the secure virtual kernel, an audio playing device to play the to-be-played audio signal.

After the secure virtual kernel performs a series of processing on the received audio signal, the secure virtual kernel may control the audio playing device of the mobile terminal to play the to-be-played audio signal. The audio playing device of the mobile terminal may be a microphone.

In this embodiment of the present disclosure, when a voice connection is established between a mobile terminal and another mobile terminal, and the voice connection meets a preset security processing trigger condition, the mobile terminal prohibits, by means of setting, a program in a common virtual kernel from accessing a shared memory between a secure virtual kernel and the common virtual kernel and accessing a related peripheral such as an audio recording device or an audio playing device; processes, by using the secure virtual kernel, an audio signal recorded by the mobile terminal and an audio signal received by the mobile terminal; and then outputs the processed communication content by using the secure virtual kernel, so that an operating system and the program running in the common virtual kernel can be prevented from obtaining unprocessed communication content, and the operating system can also be prevented from eavesdropping on the communication content by using the shared memory or the related peripheral, thereby improving communication security of the mobile terminal.

Figure 3:
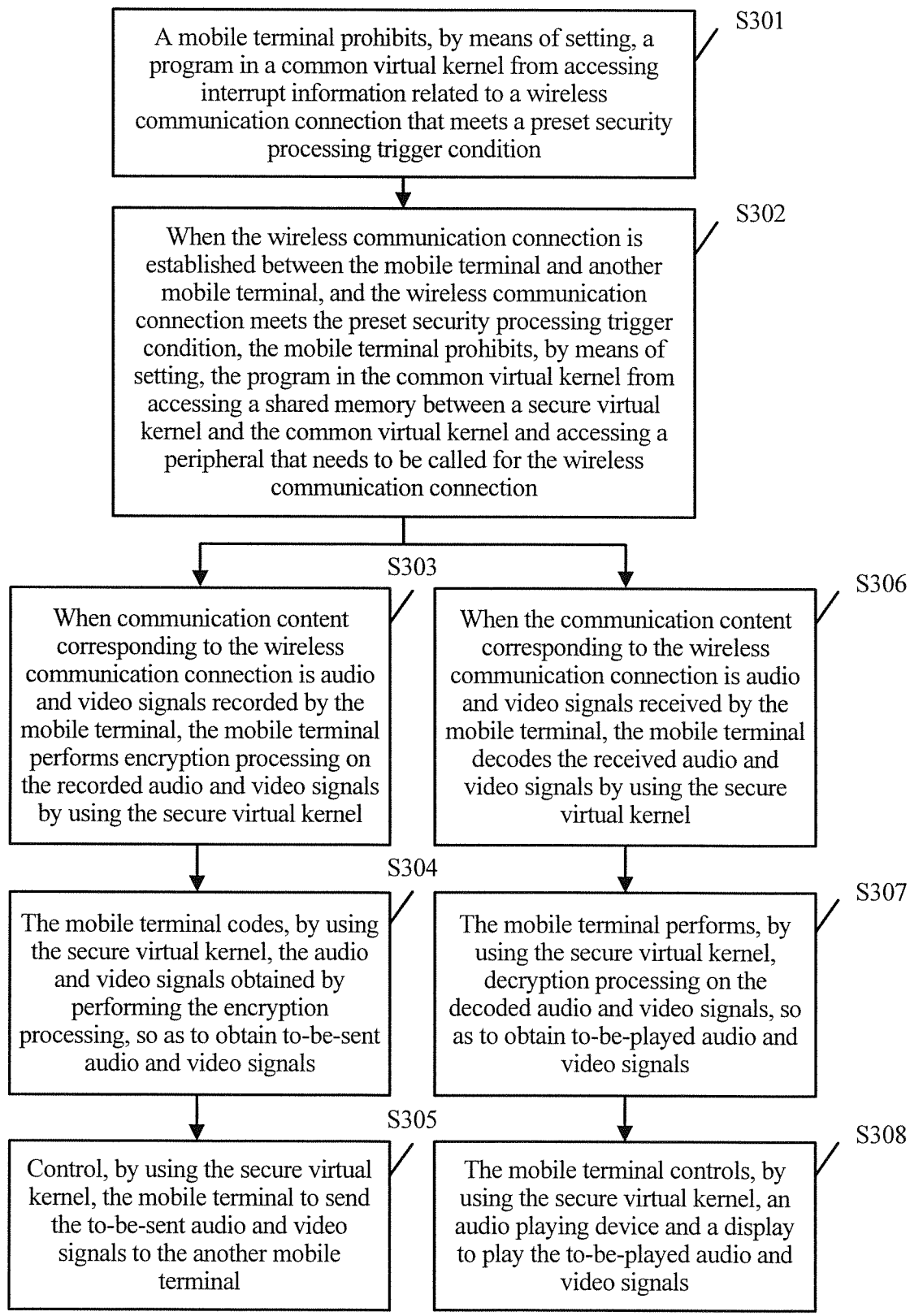
FIG. 3 is a schematic flowchart of still another embodiment of a secure communication method for a mobile terminal in the present disclosure.

Referring to FIG. 3, FIG. 3 is a schematic flowchart of still another embodiment of a secure communication method for a mobile terminal in the present disclosure. As shown in FIG. 3, in this embodiment, the secure communication method includes the following steps.

S301. A mobile terminal prohibits, by means of setting, a program in a common virtual kernel from accessing interrupt information related to a wireless communication connection that meets a preset security processing trigger condition.

In a specific implementation, for a specific implementation of S301, refer to the implementation described in step S201 in the embodiment shown in FIG. 2, and details are not described herein.

S302. When the wireless communication connection is established between the mobile terminal and another mobile terminal, and the wireless communication connection meets the preset security processing trigger condition, the mobile terminal prohibits, by means of setting, the program in the common virtual kernel from accessing a shared memory between a secure virtual kernel and the common virtual kernel and accessing a peripheral that needs to be called for the wireless communication connection.

In some feasible implementations, it may be determined, by detecting some trigger actions of the mobile terminal, that the wireless communication connection is established between the mobile terminal and the another mobile terminal; for example, when it is detected that the mobile terminal enters a network telephone program screen, or when it is detected that the mobile terminal selects a video call option of a real-time communications client, it may be considered that a video call connection is established between the mobile terminal and the another mobile terminal.

In some feasible implementations, it may be determined, by detecting some interrupt signals related to a network voice connection, that a telephone connection is established between the mobile terminal and the another mobile terminal; for example, when the another mobile terminal sends a video call connection request, an application processor detects a video call connection interrupt request.

In this embodiment, an example in which the wireless communication connection is a video call connection is used for description. The peripheral that needs to be called for the video call connection includes a video recording device, an audio recording device, an audio playing device, and a display. In a specific implementation, the video recording device may be a camera of the mobile terminal, and the audio recording device and the audio playing device may be a same device, for example, a microphone of the mobile terminal.

In this embodiment of the present disclosure, a CPU (central processing unit) of the mobile terminal includes at least an application processor. When the mobile terminal is a mobile phone, the CPU of the mobile terminal further includes a baseband processor. The application processor includes a secure virtual kernel and a common virtual kernel, and the secure virtual kernel and the common virtual kernel share a CPU, a memory, a peripheral, and a bus that are of the mobile terminal. In a specific implementation, the secure virtual kernel exclusively occupies some application processor hardware resources, and the program in the common virtual kernel is prohibited from accessing the application processor resources exclusively occupied by the secure virtual kernel.

In a specific implementation, a baseband system of the mobile terminal runs in the baseband processor; some security modules run in the secure virtual kernel; and an operating system of the mobile terminal runs in the common virtual kernel, such as Android, iOS, or Windows Phone.

In a feasible implementation, the mobile terminal may be a mobile terminal that uses an ARM processor and that is based on a TrustZone technology.

In some feasible implementations, the mobile terminal may divide a physical memory into multiple memory areas by using a TZASC (TrustZone address space controller), and configures, by using software running in the secure virtual kernel, some memory areas to be secure memory areas or non-secure memory areas, and the TZASC may prohibit the program running in the common virtual kernel from accessing the secure memory area.

In some feasible implementations, the mobile terminal configures a security attribute of the peripheral by using a TZPC (TrustZone protection controller), classifies the peripheral as a secure peripheral or a non-secure peripheral, and prohibits the program running in the common virtual kernel from accessing the secure peripheral.

S303. When communication content corresponding to the wireless communication connection is audio and video signals recorded by the mobile terminal, the mobile terminal performs encryption processing on the recorded audio and video signals by using the secure virtual kernel.

In this embodiment of the present disclosure, when the wireless communication connection is a video call connection, the communication content corresponding to the wireless communication connection includes audio and video signals recorded by the mobile terminal and audio and video signals received by the mobile terminal. The audio and video signals recorded by the mobile terminal include a video signal recorded by a video recording device of the mobile terminal and an audio signal recorded by an audio recording device of the mobile terminal.

In a process of a video call between the mobile terminal and the another mobile terminal, after obtaining the recorded audio and video signals from the video recording device and the audio recording device by using the secure virtual kernel, the mobile terminal may perform the encryption processing on the recorded audio and video signals, so as to prevent disclosure of call content during an eavesdropping attack on a mobile communications link.

S304. The mobile terminal codes, by using the secure virtual kernel, the audio and video signals obtained by performing the encryption processing, so as to obtain to-be-sent audio and video signals.

In some feasible implementations, the coding, by using the secure virtual kernel, the audio and video signals obtained by performing the encryption processing may include: performing coding and physical layer encryption on the encrypted video signal by using the secure virtual kernel, and performing processing such as analog-to-digital conversion, voice coding, channel coding, and physical layer encryption on the encrypted audio signal by using the secure virtual kernel. A coding standard of the video signal may be selected according to a resolution requirement or a compression rate requirement of the video call connection, such as H.261, H.262, H.263, H.264, MPEG-2, or MPEG-4. This is not limited in the present disclosure. Optionally, to improve video call quality, other processing such as interleaving, equalization, and filtering may be further performed on the recorded audio signal.

S305. Control, by using the secure virtual kernel, the mobile terminal to send the to-be-sent audio and video signals to the other mobile terminal.

In some feasible implementations, to save user's expenses of the mobile terminal, the to-be-sent audio and video signals are sent to the other mobile terminal by using a wireless network connection module of the mobile terminal.

In a specific implementation, to ensure a security environment of the secure virtual kernel, the wireless network connection module may run in the common virtual kernel of the mobile terminal. In this case, the secure virtual kernel may transmit the to-be-sent audio and video signals to the common virtual kernel, and instruct the common virtual kernel to send the to-be-sent audio and video signals to the another mobile terminal by using the wireless network connection module and the Internet. The wireless network connection module may be a Wi-Fi module, and is configured to enable the mobile terminal to access the Internet.

S306. When the communication content corresponding to the wireless communication connection is audio and video signals received by the mobile terminal, the mobile terminal decodes the received audio and video signals by using the secure virtual kernel.

In some feasible implementations, to save user's expenses of the mobile terminal, the mobile terminal receives, by using the wireless network connection module, the audio and video signals sent by the another mobile terminal. In a specific implementation, to ensure a security environment of the secure virtual kernel, the wireless network connection module may run in the common virtual kernel of the mobile terminal. In this case, the common virtual kernel controls the wireless network connection module to receive the audio and video signals sent by the other mobile terminal, and then transmits the received audio and video signals to the secure virtual kernel for processing. The received audio and video signals may include a video signal and an audio signal.

In a feasible implementation, the decoding the received audio and video signals by using the secure virtual kernel may include: the decoding a received video signal by using the secure virtual kernel is specifically as follows: performing physical layer decryption and video decoding on the video signal in the received audio and video signals; and the decoding a received audio signal by using the secure virtual kernel is specifically as follows: performing processing such as physical layer decryption, channel decoding, voice decoding, and digital-to-analog conversion on the audio signal in the received audio and video signals. A decoding standard of the video signal may include H.261, H.262, H.263, H.264, MPEG-2, MPEG-4, and the like, and is specifically determined according to a coding standard selected when a video is coded. Optionally, to improve video call quality, other processing such as equalization, channel separation, and de-interleaving may be further performed on the audio signal in the received audio and video signals.

In a specific implementation, the mobile terminal may separately decode the received audio signal and the received video signal by using the secure virtual kernel, so as to obtain the decoded audio signal and the decoded video signal.

S307. The mobile terminal performs, by using the secure virtual kernel, decryption processing on the decoded audio and video signals, so as to obtain to-be-played audio and video signals.

In some feasible implementations, before performing coding compression on and sending the audio and video signals received by the mobile terminal, the another mobile terminal first performs upper-layer encryption on the received audio and video signals to prevent disclosure of call content during an eavesdropping attack on a mobile communications link. The mobile terminal receives the audio and video signals obtained by performing the upper-layer encryption processing. After decoding the audio and video signals by using the secure virtual kernel, the mobile terminal further needs to perform decryption processing on the audio and video signals by using the secure virtual kernel.

In a specific implementation, the mobile terminal may separately perform decryption processing on the decoded audio signal and the decoded video signal by using the secure virtual kernel, so as to obtain a to-be-played audio signal and a to-be-played video signal.

S308. The mobile terminal controls, by using the secure virtual kernel, an audio playing device and a display to play the to-be-played audio and video signals.

After the secure virtual kernel performs a series of processing on the received audio and video signals to obtain the to-be-played audio and video signals, the secure virtual kernel may control the audio playing device and the display that are of the mobile terminal to play the to-be-played audio and video signals. The to-be-played audio signal in the to-be-played audio and video signals may be played by using the audio playing device (for example, a microphone) of the mobile terminal, and the to-be-played video signal in the to-be-played audio and video signals may be played by using the display of the mobile terminal.

In this embodiment of the present disclosure, when a video call connection is established between a mobile terminal and another mobile terminal, and the video call connection meets a preset security processing trigger condition, the mobile terminal prohibits, by means of setting, a program in a common virtual kernel from accessing a shared memory between a secure virtual kernel and the common virtual kernel and accessing a related peripheral such as a video recording device, an audio recording device, an audio playing device, or a display; processes, by using the secure virtual kernel, audio and video signals recorded by the mobile terminal and audio and video signals received by the mobile terminal; and then outputs the processed communication content by using the secure virtual kernel, so that an operating system and the program running in the common virtual kernel can be prevented from obtaining unprocessed communication content, and the operating system can also be prevented from eavesdropping on the communication content by using the shared memory or the related peripheral, thereby improving communication security of the mobile terminal.

Figure 4:
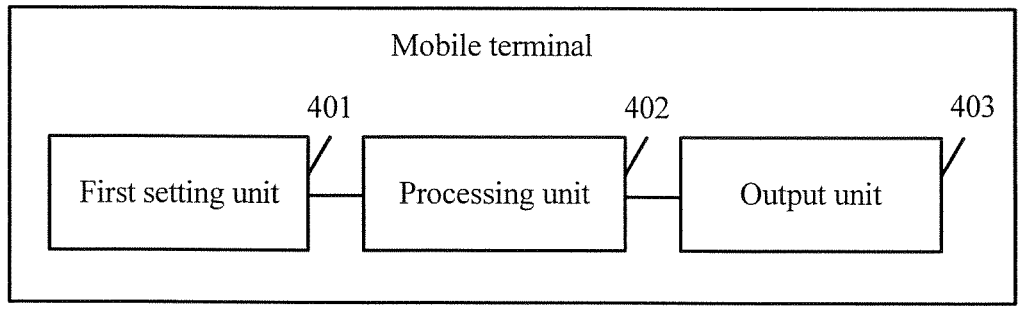
FIG. 4 is a schematic structural diagram of an embodiment of a mobile terminal in the present disclosure.

Referring to FIG. 4, FIG. 4 is a schematic structural diagram of an embodiment of a mobile terminal in the present disclosure. As shown in FIG. 4, in this embodiment, the mobile terminal includes a first setting unit 401, a processing unit 402, and an output unit 403.

The first setting unit 401 is configured to: when a wireless communication connection is established between the mobile terminal and another mobile terminal, and the wireless communication connection meets a preset security processing trigger condition, prohibit, by means of setting, a program in a common virtual kernel from accessing a shared memory between a secure virtual kernel and the common virtual kernel and accessing a peripheral that needs to be called for the wireless communication connection.

In this embodiment of the present disclosure, a CPU (central processing unit) of the mobile terminal includes at least an application processor. When the mobile terminal is a mobile phone, the CPU of the mobile terminal further includes a baseband processor. The application processor includes a secure virtual kernel and a common virtual kernel, and the secure virtual kernel and the common virtual kernel share a CPU, a memory, a peripheral, and a bus that are of the mobile terminal. In a specific implementation, the secure virtual kernel exclusively occupies some application processor hardware resources, and the program in the common virtual kernel is prohibited from accessing the application processor resources exclusively occupied by the secure virtual kernel.

Optionally, the wireless communication connection may include but is not limited to: a common telephone connection, a network voice connection (including a network telephone connection or another voice connection between real-time communications clients), a network video connection, or the like.

In some feasible implementations, in this embodiment of the present disclosure, when short message communication or mail communication may be further performed between the mobile terminal and the another mobile terminal, the program in the common virtual kernel is prohibited, by means of setting, from accessing the shared memory between the secure virtual kernel and the common virtual kernel and assessing the peripheral that needs to be called for the short message communication or the mail communication. The peripheral that needs to be called for the short message communication or the mail communication may include one or more of a push-button, a keyboard, a tablet, or a display.

In some feasible implementations, it may be determined, by detecting some trigger actions of the mobile terminal, that the wireless communication connection is established between the mobile terminal and the another mobile terminal; for example, when it is detected that the mobile terminal performs a dialing operation, or when it is detected that the mobile terminal logs in to a real-time communications client, it may be considered that the wireless communication connection is established between the mobile terminal and the another mobile terminal.

In some feasible implementations, it may be determined, by detecting some interrupt signals related to the wireless communication connection, that the wireless communication connection is established between the mobile terminal and the another mobile terminal; for example, when an incoming call is made by the another mobile terminal, the application processor receives incoming call information interrupt request sent by the baseband processor.

Optionally, that the wireless communication connection meets the preset security processing trigger condition may be: The other mobile terminal that establishes the wireless communication connection to the mobile terminal meets a security condition set by the mobile terminal, for example, the wireless communication connection is a wireless communication connection between the mobile terminal and a buddy in an address book, or may be: A type of the wireless communication connection meets a security type set by the mobile terminal, for example, the wireless communication connection is a telephone connection.

In some feasible implementations, after being powered on, the mobile terminal may prohibit, by means of setting, the program in the common virtual kernel from accessing interrupt information related to the wireless communication connection that meets the preset security processing trigger condition. For example, when detecting any incoming call signal or detecting an incoming call signal of the buddy in the address book, the baseband system sends the incoming call information interrupt request to the application processor. Because the program in the common virtual kernel is prohibited, by means of presetting, from accessing the incoming call information interrupt request, the application processor processes the incoming call information interrupt request by using the secure virtual kernel after receiving the incoming call information interrupt request.

Figure 5:
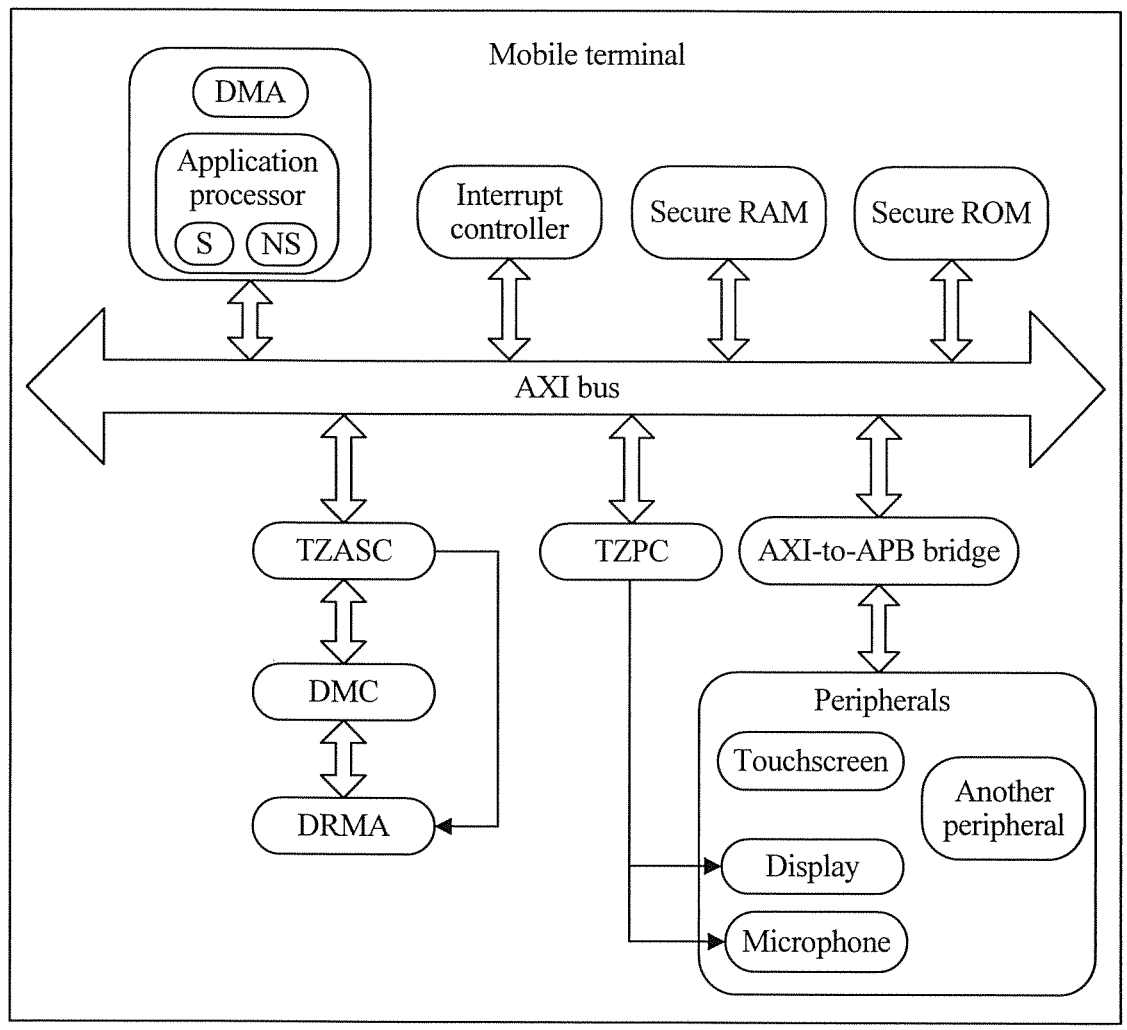
FIG. 5 is a schematic structural diagram of another embodiment of a mobile terminal in the present disclosure.

Referring to FIG. 5, the mobile terminal may be a mobile terminal that uses an ARM processor and that is based on a TrustZone technology. A System-On-a-Chip (SoC) of the mobile terminal integrates a CPU, direct memory access (DMA), a secure random access memory (RAM), a secure boot read-only memory (ROM), an interrupt controller (a GIC or a TZIC), a TZASC, a TZPC, a dynamic memory controller (DMC), a dynamic random access memory (DRAM), and the like.

Components in the SoC are connected by using an Advanced extensible Interface (AXI) bus. The secure RAM and the secure ROM are each isolated by using a software or hardware mechanism, and are configured to store a module running in the secure virtual kernel. The TZASC is configured to classify a security attribute of the shared memory (that is, the DRAM), and may be configured to set a part of the DRAM to a secure memory area, and set the rest of the DRAM to a non-secure memory area. When the common virtual kernel initiates an access request for the secure memory area, the access request is rejected. The SoC configures a security attribute of the peripheral by using the TZPC, and communicates with the peripheral by using an AXI-to-APB bridge. The AXI-to-APB bridge may sense a security attribute of a peripheral that is currently accessed by a transaction, and when a transaction of the common virtual kernel accesses a secure peripheral, the AXI-to-APB rejects the access. The SoC may set, to a security interrupt and by using the GIC (generic interrupt controller) or the TZIC (TrustZone interrupt controller), the interrupt information related to the wireless communication connection, so that the interrupt information is accessed only in the secure virtual kernel. In a specific implementation, the GIC or the TZIC is connected to all interrupt sources of the mobile terminal, and may first intercept an interrupt request of the mobile terminal; and the GIC or the TZIC hands over, to the secure virtual kernel, an interrupt request related to the wireless communication connection for processing.

In some feasible implementations, when the mobile terminal is a mobile phone, the mobile terminal includes an application processor and a baseband processor, the application processor includes a secure virtual kernel S and a common virtual kernel NS, and the secure virtual kernel and the common virtual kernel share a CPU, a memory, a peripheral, and a bus that are of the mobile terminal. A program in the common virtual kernel is prohibited from accessing a hardware resource of the secure virtual kernel. A baseband system of the mobile terminal runs in the baseband processor; some security modules run in the secure virtual kernel; and an operating system of the mobile terminal runs in the common virtual kernel, such as Android, iOS, or Windows Phone.

Optionally, when the wireless communication connection relates to a voice call (such as a common telephone call, a network telephone call, or another voice session initiated by using a real-time communications client), the peripheral that needs to be called includes at least an audio recording device and an audio playing device. In a specific implementation, the audio recording device and the audio playing device may be a same device, for example, a microphone of the mobile terminal.

Optionally, when the wireless communication connection relates to a video call, the peripheral that needs to be called includes at least a video recording device, an audio recording device, an audio playing device, and a display, such as a camera, a microphone, and a display that are of the mobile terminal.

In some feasible implementations, the mobile terminal divides a physical memory into multiple memory areas by using a TZASC (TrustZone address space controller), and configures, by using software running in the secure virtual kernel, some memory areas to be secure memory areas or non-secure memory areas, and the TZASC may prohibit the program running in the common virtual kernel from accessing the secure memory area.

In some feasible implementations, the mobile terminal configures a security attribute of the peripheral by using a TZPC (TrustZone protection controller), classifies the peripheral as a secure peripheral or a non-secure peripheral, and prohibits the program running in the common virtual kernel from accessing the secure peripheral.

The processing unit 402 is configured to perform, by using the secure virtual kernel, preset policy-based processing on communication content corresponding to the wireless communication connection.

Optionally, the communication content corresponding to the wireless communication connection includes communication content to be sent by the mobile terminal and communication content received by the mobile terminal.

Optionally, for the to-be-sent communication content, the preset policy-based processing may include one or more of encryption, analog-to-digital conversion, coding, modulation, or the like. For the received communication content, the preset policy-based processing may include one or more of decryption, demodulation, decoding, digital-to-analog conversion, or the like. The preset policy-based processing is performed by using the secure virtual kernel of the mobile terminal, and the program in the common virtual kernel cannot access communication content obtained before the preset policy-based processing is performed.

In a specific implementation, because there is a large amount of code in an operating system running in a common virtual kernel, there is a relatively large quantity of security vulnerabilities. Because there is a small amount of code in a module running in a secure virtual kernel, security can be easily verified. Preset policy-based processing is performed on communication content by using the secure virtual kernel or a baseband processor, so that the operating system running in the common virtual kernel can be prevented from obtaining communication content obtained before the preset policy-based processing is performed, and the operating system can be prevented from eavesdropping on the communication content.

The output unit 403 is configured to output, by using the secure virtual kernel, the communication content obtained by performing the preset policy-based processing.

In a specific implementation, after performing the preset policy-based processing on the communication content to be sent by the mobile terminal, the mobile terminal may send the to-be-sent communication content by using a radio frequency module or a wireless network connection module. Communication content of a telephone call or a short message may be sent by using the radio frequency module of the mobile terminal; and communication content of a mail, a network voice call, a video call, or the like may be sent by using the network connection module. In this embodiment of the present disclosure, the network connection module may be a Wi-Fi module, and is configured to enable the mobile terminal to access the Internet.

After performing the preset policy-based processing on the communication content received by the mobile terminal, the mobile terminal may output the received communication content. Optionally, if the received communication content is a voice, the received communication content may be output by using an audio playing device (for example, a microphone); if the received communication content is a video, the received communication content may be output by using a display and an audio playing device; or if the received communication content is a text or a picture, the received communication content may be output by using a display.

In this embodiment of the present disclosure, when a wireless communication connection is established between a mobile terminal and another mobile terminal, and the wireless communication connection meets a preset security processing trigger condition, the mobile terminal prohibits, by means of setting, a program in a common virtual kernel from accessing a shared memory between a secure virtual kernel and the common virtual kernel and accessing a peripheral that needs to be called for the wireless communication connection; performs, by using the secure virtual kernel, preset policy-based processing on communication content corresponding to the wireless communication connection; and then outputs, by using the secure virtual kernel, the communication content obtained by performing the preset policy-based processing, so that an operating system and the program running in the common virtual kernel can be prevented from obtaining unprocessed communication content, and the operating system can also be prevented from eavesdropping on the communication content by using the shared memory or the related peripheral, thereby improving communication security of the mobile terminal.

Figure 6:
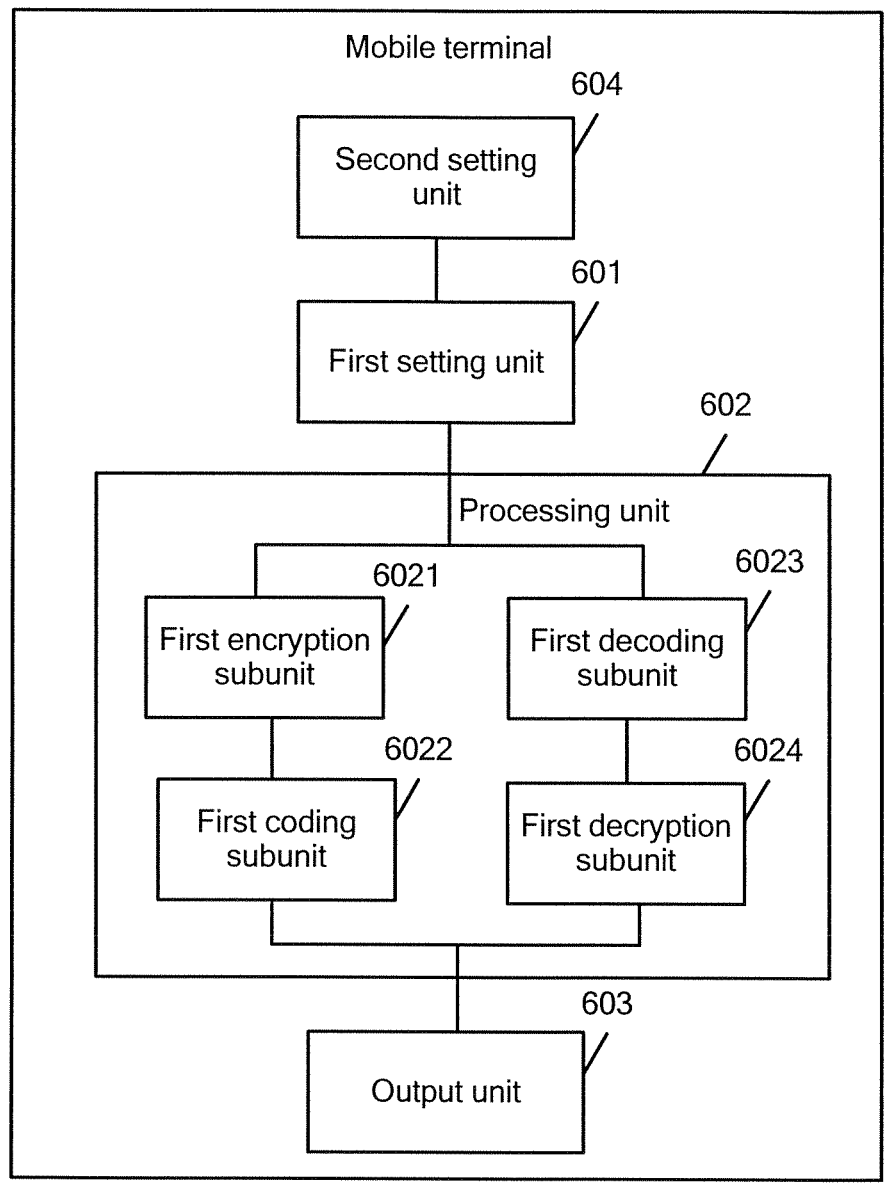
FIG. 6 is a schematic structural diagram of still another embodiment of a mobile terminal in the present disclosure.

Referring to FIG. 6, FIG. 6 is a schematic structural diagram of still another embodiment of a mobile terminal in the present disclosure. As shown in FIG. 6, in this embodiment, the mobile terminal includes a first setting unit 601, a processing unit 602, an output unit 603, and a second setting unit 604.

The second setting unit 604 is configured to prohibit, by means of setting, a program in a common virtual kernel from accessing interrupt information related to a wireless communication connection that meets a preset security processing trigger condition.

Optionally, the wireless communication connection may include but is not limited to: a common telephone connection, a network voice connection (including a network telephone connection or another voice connection between real-time communications clients), a network video connection, or the like.

In some feasible implementations, in addition to the interrupt information related to the wireless communication connection that meets the preset security processing trigger condition, the mobile terminal may further prohibit, by means of setting, the program in the common virtual kernel from accessing some interrupt signals related to a specific type of the wireless communication connection, such as a short message or a mail.

Optionally, that the wireless communication connection meets the preset security processing trigger condition may be: Another mobile terminal that establishes the wireless communication connection to the mobile terminal meets a security condition set by the mobile terminal, for example, the wireless communication connection is a wireless communication connection between the mobile terminal and a buddy in an address book, or may be: A type of the wireless communication connection meets a security type set by the mobile terminal, for example, the wireless communication connection is a telephone connection.

In a specific implementation, after being powered on, the mobile terminal may prohibit, by means of setting, the program in the common virtual kernel from accessing the interrupt information related to the wireless communication connection that meets the preset security processing trigger condition. When receiving the interrupt information related to the wireless communication connection that meets the preset security processing trigger condition, the mobile terminal hands over the interrupt information to a secure virtual kernel for processing.

In some feasible implementations, the second setting unit 604 may set, to a security interrupt and by using a GIC (generic interrupt controller) or a TZIC (TrustZone interrupt controller), the interrupt information related to the wireless communication connection, so that the interrupt information is accessed only in the secure virtual kernel. In a specific implementation, the GIC or the TZIC is connected to all interrupt sources of the mobile terminal, and may first intercept an interrupt request of the mobile terminal; and the GIC or the TZIC hands over, to the secure virtual kernel, an interrupt request related to the wireless communication connection for processing.

The first setting unit 601 is configured to: when the wireless communication connection is established between the mobile terminal and the another mobile terminal, and the wireless communication connection meets the preset security processing trigger condition, prohibit, by means of setting, the program in the common virtual kernel from accessing a shared memory between the secure virtual kernel and the common virtual kernel and accessing a peripheral that needs to be called for the wireless communication connection.

In some feasible implementations, the first setting unit 601 may perform the implementation performed by the first setting unit 401 described in the embodiment shown in FIG. 4. In this embodiment, the wireless communication connection is a voice connection, including a telephone connection or a network voice connection. In this case, the peripheral that needs to be called for the wireless communication connection includes an audio recording device and an audio playing device, and the first setting unit 601 may be specifically configured to prohibit, by means of setting, the program in the common virtual kernel from accessing the shared memory between the secure virtual kernel and the common virtual kernel and accessing the audio recording device and the audio playing device that are of the mobile terminal. For a specific implementation of determining that the voice connection is established between the mobile terminal and the other mobile terminal, refer to related description of step S202 in the embodiment shown in FIG. 2.

In some feasible implementations, the processing unit 602 may perform the implementation performed by the processing unit 402 described in the embodiment shown in FIG. 4. In this embodiment, the processing unit 602 may include a first encryption subunit 6021, a first coding subunit 6022, a first decoding subunit 6023, and a first decryption subunit 6024.

The first encryption subunit 6021 is configured to: when the communication content is an audio signal recorded by the audio recording device, perform encryption processing on the recorded audio signal by using the secure virtual kernel.

In this embodiment of the present disclosure, when the wireless communication connection is a voice connection, the communication content corresponding to the wireless communication connection includes an audio signal recorded by the mobile terminal and an audio signal received by the mobile terminal. The audio signal recorded by the mobile terminal is call content to be conveyed by a user of the mobile terminal to a user of the another mobile terminal in a call process, and the audio signal received by the mobile terminal is call content to be conveyed by the user of the another mobile terminal to the user of the mobile terminal in the call process.

Specifically, the recorded audio signal is recorded by the audio recording device (for example, a microphone) of the mobile terminal. After obtaining the recorded audio signal from the audio recording device, the secure virtual kernel may perform the encryption processing on the recorded audio signal by using the first encryption subunit 6021, so as to prevent disclosure of call content during an eavesdropping attack on a mobile communications link.

The first coding subunit 6022 is configured to code, by using the secure virtual kernel, the audio signal obtained by performing the encryption processing, so as to obtain a to-be-sent audio signal.

In some feasible implementations, when the wireless communication connection is a telephone connection, the coding, by using the secure virtual kernel, the audio signal obtained by performing the encryption processing may include: instructing, by using the secure virtual kernel, a baseband processor of the mobile terminal to perform analog-to-digital conversion, voice coding, channel coding, and physical layer encryption and modulation on the audio signal obtained after the encryption processing is performed. Optionally, to improve call quality, the baseband processor may be further instructed to perform other processing such as interleaving, equalization, and filtering on the recorded audio signal.

In some feasible implementations, when the wireless communication connection is a network voice connection, the coding, by using the secure virtual kernel, the audio signal obtained by performing the encryption processing may specifically include: performing, by using a hardware resource or a software resource of the secure virtual kernel, analog-to-digital conversion, voice coding, channel coding, and physical layer encryption on the audio signal obtained by performing the encryption processing. Optionally, to improve network voice call quality, other processing such as interleaving, equalization, and filtering may be further performed on the recorded audio signal.

The first decoding subunit 6023 is configured to: when the communication content is an audio signal received by the mobile terminal, decode the audio signal by using the secure virtual kernel.

In some feasible implementations, when the wireless communication connection is a telephone connection, the mobile terminal receives, by using a radio frequency module, an audio signal sent by the other mobile terminal by using a mobile phone network. In this case, the decoding the audio signal by using the secure virtual kernel may include: instructing, by using the secure virtual kernel, the baseband processor to perform processing such as demodulation, channel decoding, physical layer decryption, voice decoding, and digital-to-analog conversion on the received audio signal. Optionally, to improve call quality, other processing such as equalization, channel separation, and de-interleaving may be further performed on the received audio signal.

In some feasible implementations, when the wireless communication connection is a network voice connection, the mobile terminal receives, by using a wireless network connection module, an audio signal sent by the other mobile terminal by using the Internet. Specifically, to ensure a security environment of the secure virtual kernel, the wireless network connection module may run in the common virtual kernel of the mobile terminal. The common virtual kernel controls the wireless network connection module to receive the audio signal sent by the other mobile terminal, and then transmits the received audio signal to the secure virtual kernel for processing. In this case, the decoding the audio signal by using the secure virtual kernel may include: performing channel decoding, physical layer decryption, voice decoding, and digital-to-analog conversion on the received audio signal by using the secure virtual kernel. Optionally, to improve call quality, other processing such as equalization, channel separation, and de-interleaving may be further performed on the received audio signal.

The first decryption subunit 6024 is configured to perform, by using the secure virtual kernel, decryption processing on the decoded audio signal, so as to obtain a to-be-played audio signal.

In some feasible implementations, before coding and sending the received audio signal, the another mobile terminal first performs upper-layer encryption on the received audio signal to prevent disclosure of call content during an eavesdropping attack on a mobile communications link. The mobile terminal receives the audio signal obtained by performing the upper-layer encryption processing. After decoding the audio signal, the first decryption subunit 6024 performs decryption processing on the audio signal.

In some feasible implementations, the output unit 603 may perform the implementation performed by the output unit 403 described in the embodiment shown in FIG. 4. In this embodiment of the present disclosure, the output unit 603 may be further specifically configured to: control, by using the secure virtual kernel, the mobile terminal to send the to-be-sent audio signal to the other mobile terminal; or control, by using the secure virtual kernel, the audio playing device to play the to-be-played audio signal.

In some feasible implementations, when the wireless communication connection is a telephone connection, the controlling, by using the secure virtual kernel, the mobile terminal to send the to-be-sent audio signal to the another mobile terminal may include: controlling, by using the secure virtual kernel, a radio frequency module of the mobile terminal to send the to-be-sent audio signal to the other mobile terminal.

In some feasible implementations, when the wireless communication connection is a network voice connection, the controlling, by using the secure virtual kernel, the mobile terminal to send the to-be-sent audio signal to the other mobile terminal may include: controlling, by using the secure virtual kernel, a wireless network connection module (for example, a Wi-Fi module) of the mobile terminal to send the to-be-sent audio signal to the other mobile terminal. Specifically, to ensure a security environment of the secure virtual kernel, the wireless network connection module may run in the common virtual kernel of the mobile terminal. After obtaining the to-be-sent audio signal, the secure virtual kernel may transmit the to-be-sent audio signal to the common virtual kernel, and instruct the common virtual kernel to send the to-be-sent audio signal to the other mobile terminal by using the wireless network connection module.

After the secure virtual kernel performs a series of processing on the received audio signal, the secure virtual kernel may control the audio playing device of the mobile terminal to play the to-be-played audio signal. The audio playing device of the mobile terminal may be a microphone. In this embodiment of the present disclosure, when a voice connection is established between a mobile terminal and another mobile terminal, and the voice connection meets a preset security processing trigger condition, the mobile terminal prohibits, by means of setting, a program in a common virtual kernel from accessing a shared memory between a secure virtual kernel and the common virtual kernel and accessing a related peripheral such as an audio recording device or an audio playing device; obtains and processes an audio signal by using the secure virtual kernel and a baseband processor of the mobile terminal; and then sends or outputs the processed audio signal to the other mobile terminal, so that an operating system and the program running in the common virtual kernel can be prevented from obtaining unprocessed communication content, and the operating system can also be prevented from eavesdropping on the communication content by using the shared memory or the related peripheral, thereby improving communication security of the mobile terminal.

Figure 7:
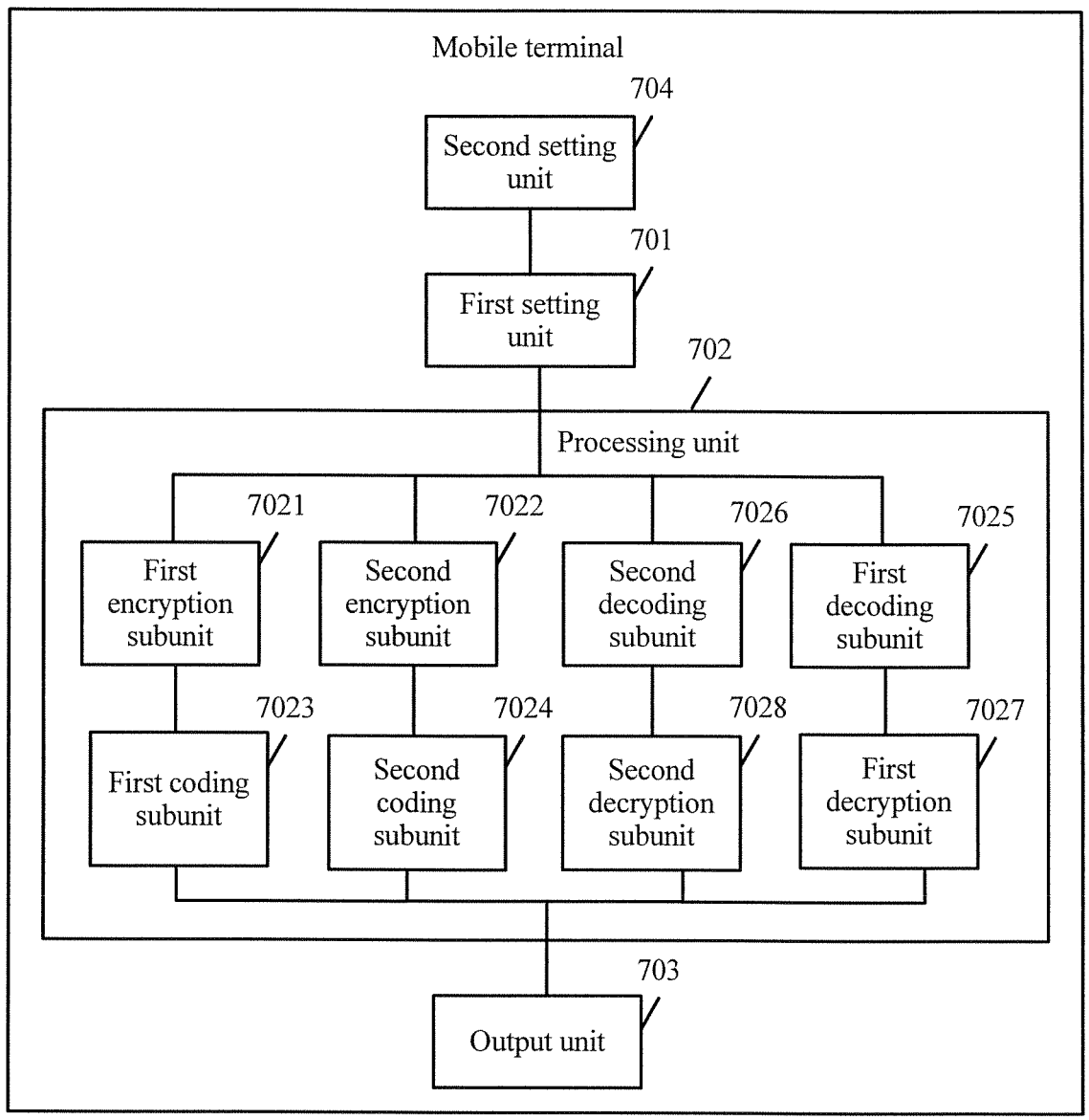
FIG. 7 is a schematic structural diagram of yet another embodiment of a mobile terminal in the present disclosure.

Referring to FIG. 7, FIG. 7 is a schematic structural diagram of yet another embodiment of a mobile terminal in the present disclosure. As shown in FIG. 7, in this embodiment, the mobile terminal includes a first setting unit 701, a processing unit 702, an output unit 703, and a second setting unit 704.

The second setting unit 704 is configured to prohibit, by means of setting, a program in a common virtual kernel from accessing interrupt information related to a wireless communication connection that meets a preset security processing trigger condition.

In some feasible implementations, the second setting unit 704 may perform the implementation performed by the second setting unit 604 described in the embodiment shown in FIG. 6.

The first setting unit 701 is configured to: when the wireless communication connection is established between the mobile terminal and another mobile terminal, and the wireless communication connection meets the preset security processing trigger condition, prohibit, by means of setting, the program in the common virtual kernel from accessing a shared memory between a secure virtual kernel and the common virtual kernel and accessing a peripheral that needs to be called for the wireless communication connection.

In some feasible implementations, the first setting unit 701 may perform the implementation performed by the first setting unit 401 described in the embodiment shown in FIG. 4. In this embodiment, the wireless communication connection is a video call connection, and the peripheral that needs to be called for the wireless communication connection includes a video recording device, an audio recording device, an audio playing device, and a display. In this case, the first setting unit 701 may be specifically configured to prohibit, by means of setting, the program in the common virtual kernel from accessing the shared memory between the secure virtual kernel and the common virtual kernel and accessing the video recording device, the audio recording device, the audio playing device, and the display that are of the mobile terminal. For a specific implementation of determining that the video call connection is established between the mobile terminal and the other mobile terminal, refer to related description of step S302 in the embodiment shown in FIG. 3.

In some feasible implementations, the processing unit 702 may perform the implementation performed by the processing unit 402 described in the embodiment shown in FIG. 4. In this embodiment, the processing unit 702 may include a first encryption subunit 7021, a second encryption subunit 7022, a first coding subunit 7023, a second coding subunit 7024, a first decoding subunit 7025, a second decoding subunit 7026, a first decryption subunit 7027, and a second decryption subunit 7028.

The first encryption subunit 7021 is configured to: when the communication content is an audio signal recorded by the audio recording device, perform encryption processing on the recorded audio signal by using the secure virtual kernel.

The second encryption subunit 7021 is configured to: when the communication content is a video signal recorded by the video recording device, perform encryption processing on the recorded video signal by using the secure virtual kernel.

In this embodiment of the present disclosure, when the wireless communication connection is a video call connection, the communication content corresponding to the wireless communication connection includes an audio signal recorded by the mobile terminal, a video signal recorded by the mobile terminal, an audio signal received by the mobile terminal, and a video signal received by the mobile terminal.

In a process of a video call between the mobile terminal and the another mobile terminal, after obtaining the recorded audio signal and the recorded video signal from the video recording device and the audio recording device by using the secure virtual kernel, the mobile terminal may perform encryption processing on the recorded audio signal and the recorded video signal, so as to prevent disclosure of call content during an eavesdropping attack on a mobile communications link.

In a feasible implementation, the encryption processing may be performed, by using the first encryption subunit 7021, on the audio signal in the audio and video signals recorded by the mobile terminal, and the encryption processing is performed, by using the second encryption subunit 7022, on the video signal in the audio and video signals recorded by the mobile terminal.

The first coding subunit 7023 is configured to code, by using the secure virtual kernel, the audio signal obtained by performing the encryption processing, so as to obtain a to-be-sent audio signal.

The second coding subunit 7024 is configured to code, by using the secure virtual kernel, the video signal obtained by performing the encryption processing, so as to obtain a to-be-sent video signal.

In some feasible implementations, the first coding subunit 7023 may be specifically configured to perform processing such as analog-to-digital conversion, voice coding, channel coding, and physical layer encryption on the encrypted audio signal. Optionally, to improve video call quality, the first coding subunit 7023 may further preform other processing such as interleaving, equalization, and filtering on the recorded audio signal.

In some feasible implementations, the second coding subunit 7024 may be specifically configured to perform coding and physical layer encryption on the encrypted video signal. A coding standard of the video signal may be selected according to a resolution requirement or a compression rate requirement of the video call connection, such as H.261, H.262, H.263, H.264, MPEG-2, or MPEG-4. This is not limited in the present disclosure.

The first decoding subunit 7025 is configured to: when the communication content is an audio signal received by the mobile terminal, decode the audio signal by using the secure virtual kernel.

The second decoding subunit 7026 is configured to: when the communication content is a video signal received by the mobile terminal, decode the received video signal by using the secure virtual kernel.

In some feasible implementations, to save user's expenses of the mobile terminal, the mobile terminal receives, by using a wireless network connection module, the audio signal and the video signal that are sent by the other mobile terminal. In a specific implementation, to ensure a security environment of the secure virtual kernel, the wireless network connection module may run in the common virtual kernel of the mobile terminal. In this case, the common virtual kernel controls the wireless network connection module to receive the audio signal and the video signal that are sent by the other mobile terminal, and then transmits the received audio signal and the received video signal to the secure virtual kernel for processing.

In a feasible implementation, the first decoding subunit 7025 may be specifically configured to perform processing such as physical layer decryption, channel decoding, voice decoding, and digital-to-analog conversion on the received audio signal. Optionally, to improve video call quality, the first decoding subunit 7025 may further perform other processing such as equalization, channel separation, and de-interleaving on the audio signal in the received audio and video signals.

In a feasible implementation, the second decoding subunit 7026 may be specifically configured to perform physical layer decryption and video decoding on the received video signal. A decoding standard of the video signal may include H.261, H.262, H.263, H.264, MPEG-2, MPEG-4, and the like, and is specifically determined according to a coding standard selected when a video is coded.

The first decryption subunit 7027 is configured to perform, by using the secure virtual kernel, decryption processing on the decoded audio signal, so as to obtain a to-be-played audio signal.

The second decryption subunit 7028 is configured to perform, by using the secure virtual kernel, decryption processing on the decoded video signal, so as to obtain a to-be-played video signal.

In some feasible implementations, before performing coding compression on and sending the audio signal and the video signal that are received by the mobile terminal, the other mobile terminal first performs upper-layer encryption on the received audio signal and the received video signal to prevent disclosure of call content during an eavesdropping attack on a mobile communications link. The mobile terminal receives the audio signal and the video signal that are obtained by performing the upper-layer encryption processing. After decoding the audio signal and the video signal by using the secure virtual kernel, the mobile terminal further needs to perform decryption processing on the audio signal and the video signal by using the secure virtual kernel.

In a feasible implementation, the decryption processing may be performed, by using the first decryption subunit 7027, on the audio signal received by the mobile terminal, and the decryption processing is performed, by using the second decryption subunit 7028, on the video signal received by the mobile terminal.

In some feasible implementations, the output unit 703 may perform the implementation performed by the output unit 403 described in the embodiment shown in FIG. 4. In this embodiment, the wireless communication connection is a video call connection, and the output unit 703 may be specifically configured to: control, by using the secure virtual kernel, the mobile terminal to send the to-be-sent audio signal and the to-be-sent video signal to the another mobile terminal; or control, by using the secure virtual kernel, the audio playing device to play the to-be-played audio signal, and control, by using the secure virtual kernel, the display to play the to-be-played video signal.

In some feasible implementations, to save user's expenses of the mobile terminal, the to-be-sent audio signal and the to-be-sent video signal may be sent to the other mobile terminal by using a wireless network connection module of the mobile terminal. In a specific implementation, to ensure a security environment of the secure virtual kernel, the wireless network connection module may run in the common virtual kernel of the mobile terminal. In this case, the secure virtual kernel of the mobile terminal may transmit the to-be-sent audio signal and to-be-sent video signal to the common virtual kernel, and instruct the common virtual kernel to send the to-be-sent audio signal and the to-be-sent video signal to the other mobile terminal by using the wireless network connection module and the Internet. The wireless network connection module may be a Wi-Fi module, and is configured to enable the mobile terminal to access the Internet.

After the secure virtual kernel performs a series of processing on the received audio signal and the received video signal to obtain the to-be-played audio signal and the to-be-played video signal, the secure virtual kernel may control the audio playing device and the display that are of the mobile terminal to play the to-be-played audio signal and the to-be-played video signal. The to-be-played audio signal may be played by using the audio playing device (for example, a microphone) of the mobile terminal, and the to-be-played video signal may be played by using the display of the mobile terminal.

In this embodiment of the present disclosure, when a video call connection is established between a mobile terminal and another mobile terminal, and the video call connection meets a preset security processing trigger condition, the mobile terminal prohibits, by means of setting, a program in a common virtual kernel from accessing a shared memory between a secure virtual kernel and the common virtual kernel and accessing a related peripheral such as a video recording device, an audio recording device, an audio playing device, or a display; processes, by using the secure virtual kernel, audio and video signals recorded by the mobile terminal and audio and video signals received by the mobile terminal; and then outputs the processed communication content by using the secure virtual kernel, so that an operating system and the program running in the common virtual kernel can be prevented from obtaining unprocessed communication content, and the operating system can also be prevented from eavesdropping on the communication content by using the shared memory or the related peripheral, thereby improving communication security of the mobile terminal.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification are examples, and the involved actions and modules are not necessarily required by this application.

In the foregoing embodiments, the description of each embodiment has respective focuses. For a part that is not described in detail in an embodiment, reference may be made to related descriptions in other embodiments.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

A secure communication method for a mobile terminal and a mobile terminal provided in the embodiments of this application are described in detail above. A principle and implementations of this application are described herein by using specific examples, and the description about the foregoing embodiments is merely intended to help understand the method and core ideas of this application. In addition, a person of ordinary skill in the art can make variations and modifications to this application in terms of specific implementations and application scope according to the ideas of this application. In conclusion, the content of this specification shall not be construed as a limitation on this application.

What is claimed is:

1. A secure communication method for a mobile terminal, wherein an application processor of the mobile terminal comprises a secure virtual kernel and a common virtual kernel which share a central processing unit (CPU), a memory, a bus, and a peripheral that are of the mobile terminal, and wherein a program in the common virtual kernel is prohibited from accessing an application processor resource of the secure virtual kernel, the secure communication method comprising:

when a wireless communication connection is established between the mobile terminal and another mobile terminal, and the wireless communication connection meets a preset security processing trigger condition, prohibiting, by the mobile terminal, the program in the common virtual kernel from accessing a shared memory between the secure virtual kernel and the common virtual kernel and from accessing a peripheral used by the wireless communication connection;

performing, by the mobile terminal by using the secure virtual kernel, preset policy-based processing on communication content corresponding to the wireless communication connection; and outputting, by the mobile terminal by using the secure virtual kernel, the communication content obtained by performing the preset policy-based processing; and wherein before the wireless communication connection is established between the mobile terminal and the other mobile terminal, the secure communication method further comprises:

prohibiting, by the mobile terminal, the program in the common virtual kernel from accessing interrupt information related to the wireless communication connection that meets the preset security processing trigger condition.

2. The method according to claim 1, wherein:

the peripheral to be used by the wireless communication connection comprises an audio recording device, and the communication content comprises a recorded audio signal;

performing, by the mobile terminal by using the secure virtual kernel, preset policy-based processing on communication content corresponding to the wireless communication connection comprises:

when the communication content is an audio signal recorded by the audio recording device, performing, by the mobile terminal, encryption processing on the recorded audio signal by using the secure virtual kernel, and coding, by the mobile terminal by using the secure virtual kernel, the audio signal obtained by performing the encryption processing, so as to obtain a to-be-sent audio signal; and outputting, by the mobile terminal by using the secure virtual kernel, the communication content obtained by performing the preset policy-based processing comprises:

controlling, by using the secure virtual kernel, the mobile terminal to send the to-be-sent audio signal to the another mobile terminal.

3. The method according to claim 1, wherein:

the peripheral to be used by the wireless communication connection comprises an audio playing device, and the communication content comprises a received audio signal;

performing, by the mobile terminal by using the secure virtual kernel, preset policy-based processing on communication content corresponding to the wireless communication connection comprises:

when the communication content is an audio signal received by the mobile terminal, decoding, by the mobile terminal, the audio signal by using the secure virtual kernel, and performing, by the mobile terminal by using the secure virtual kernel, decryption processing on the decoded audio signal, so as to obtain a to-be-played audio signal; and outputting, by the mobile terminal by using the secure virtual kernel, the communication content obtained by performing the preset policy-based processing comprises:

controlling, by the mobile terminal by using the secure virtual kernel, the audio playing device to play the to-be-played audio signal.

4. The method according to claim 2, wherein:

the peripheral to be used by the wireless communication connection comprises an audio playing device, and the communication content comprises a received audio signal;

performing, by the mobile terminal by using the secure virtual kernel, preset policy-based processing on communication content corresponding to the wireless communication connection comprises:

when the communication content is an audio signal received by the mobile terminal, decoding, by the mobile terminal, the audio signal by using the secure virtual kernel, and performing, by the mobile terminal by using the secure virtual kernel, decryption processing on the decoded audio signal, so as to obtain a to-be-played audio signal; and outputting, by the mobile terminal by using the secure virtual kernel, the communication content obtained by performing the preset policy-based processing comprises:

controlling, by the mobile terminal by using the secure virtual kernel, the audio playing device to play the to-be-played audio signal.

5. The secure communication method according to claim 1, wherein:

the peripheral to be used by the wireless communication connection comprises a video recording device, and the communication content comprises a recorded video signal;

performing, by the mobile terminal by using the secure virtual kernel, preset policy-based processing on communication content corresponding to the wireless communication connection comprises:

when the communication content is a video signal recorded by the video recording device, performing, by the mobile terminal, encryption processing on the recorded video signal by using the secure virtual kernel, and coding, by the mobile terminal by using the secure virtual kernel, the video signal obtained by performing the encryption processing, so as to obtain a to-be-sent video signal; and outputting, by the mobile terminal by using the secure virtual kernel, the communication content obtained by performing the preset policy-based processing comprises:

controlling, by using the secure virtual kernel, the mobile terminal to send the to-be-sent video signal to the another mobile terminal.

6. The secure communication method according to claim 1, wherein:

the peripheral to be used by the wireless communication connection comprises a display, and the communication content comprises a received video signal;

performing, by the mobile terminal by using the secure virtual kernel, preset policy-based processing on communication content corresponding to the wireless communication connection comprises:

when the communication content is a video signal received by the mobile terminal, decoding, by the mobile terminal, the received video signal by using the secure virtual kernel, and performing, by the mobile terminal by using the secure virtual kernel, decryption processing on the decoded video signal, so as to obtain a to-be-played video signal; and outputting, by the mobile terminal by using the secure virtual kernel, the communication content obtained by performing the preset policy-based processing comprises:

controlling, by the mobile terminal by using the secure virtual kernel, the display to play the to-be-played video signal.

7. A mobile terminal, wherein an application processor of the mobile terminal comprises a secure virtual kernel and a common virtual kernel which share a central processing unit (CPU), a memory, a bus, and a peripheral that are of the mobile terminal, and a program in the common virtual kernel is prohibited from accessing an application processor resource of the secure virtual kernel, the mobile terminal comprising:

a first setting unit, configured to: when a wireless communication connection is established between the mobile terminal and another mobile terminal, and the wireless communication connection meets a preset security processing trigger condition, prohibit, by means of setting, the program in the common virtual kernel from accessing a shared memory between the secure virtual kernel and the common virtual kernel and accessing a peripheral to be used by the wireless communication connection;

a processing unit, configured to perform, by using the secure virtual kernel, preset policy-based processing on communication content corresponding to the wireless communication connection;

an output unit, configured to output, by using the secure virtual kernel, the communication content obtained by performing the preset policy-based processing; and a second setting unit, configured to prohibit, by means of setting, the program in the common virtual kernel from accessing interrupt information related to the wireless communication connection that meets the preset security processing trigger condition.

8. The mobile terminal according to claim 7, wherein:

the peripheral to be used by the wireless communication connection comprises an audio recording device, and the communication content comprises a recorded audio signal;

the processing unit comprises:

a first encryption subunit, configured to: when the communication content is an audio signal recorded by the audio recording device, perform encryption processing on the recorded audio signal by using the secure virtual kernel, and a first coding subunit, configured to code, by using the secure virtual kernel, the audio signal obtained by performing the encryption processing, so as to obtain a to-be-sent audio signal; and the output unit is configured to control, by using the secure virtual kernel, the mobile terminal to send the to-be-sent audio signal to the another mobile terminal.

9. The mobile terminal according to claim 7, wherein:

the peripheral to be used by the wireless communication connection comprises an audio playing device, and the communication content comprises a received audio signal;

the processing unit comprises:

a first decoding subunit, configured to: when the communication content is an audio signal received by the mobile terminal, decode the audio signal by using the secure virtual kernel, and a first decryption subunit, configured to perform, by using the secure virtual kernel, decryption processing on the decoded audio signal, so as to obtain a to-be-played audio signal; and the output unit is configured to control, by using the secure virtual kernel, the audio playing device to play the to-be-played audio signal.

10. The mobile terminal according to claim 8, wherein:

the peripheral to be used by the wireless communication connection comprises an audio playing device, and the communication content comprises a received audio signal;

the processing unit comprises:

a first decoding subunit, configured to: when the communication content is an audio signal received by the mobile terminal, decode the audio signal by using the secure virtual kernel, and a first decryption subunit, configured to perform, by using the secure virtual kernel, decryption processing on the decoded audio signal, so as to obtain a to-be-played audio signal; and the output unit is configured to control, by using the secure virtual kernel, the audio playing device to play the to-be-played audio signal.

11. The mobile terminal according to claim 7, wherein:

the peripheral to be used by the wireless communication connection comprises a video recording device, and the communication content comprises a recorded video signal;

the processing unit comprises:

a second encryption subunit, configured to: when the communication content is a video signal recorded by the video recording device, perform encryption processing on the recorded video signal by using the secure virtual kernel, and a second coding subunit, configured to code, by using the secure virtual kernel, the video signal obtained by performing the encryption processing, so as to obtain a to-be-sent video signal; and the output unit is configured to control, by using the secure virtual kernel, the mobile terminal to send the to-be-sent video signal to the another mobile terminal.

12. The mobile terminal according to claim 7, wherein:

the peripheral to be used by the wireless communication connection comprises a display, and the communication content comprises a received video signal;

the processing unit further comprises:

a second decoding subunit, configured to: when the communication content is a video signal received by the mobile terminal, decode the received video signal by using the secure virtual kernel, and a second decryption subunit, configured to perform, by using the secure virtual kernel, decryption processing on the decoded video signal, so as to obtain a to-be-played video signal; and the output unit is configured to control, by using the secure virtual kernel, the display to play the to-be-played video signal.

* * * * *